US012222794B2

(12) United States Patent
Wang et al.

(10) Patent No.: US 12,222,794 B2
(45) Date of Patent: *Feb. 11, 2025

(54) MANAGEMENT OF NEAR FIELD COMMUNICATIONS USING A LOW POWER EXPRESS MODE OF AN ELECTRONIC DEVICE

(71) Applicant: Apple Inc., Cupertino, CA (US)

(72) Inventors: Yong Wang, Cupertino, CA (US); Gordon Y. Scott, Cupertino, CA (US); Andrew C. Chang, Sunnyvale, CA (US); Scott A. Williams, San Jose, CA (US)

(73) Assignee: Apple Inc., Cupertino, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 17/399,031

(22) Filed: Aug. 10, 2021

(65) Prior Publication Data

US 2022/0035435 A1    Feb. 3, 2022

Related U.S. Application Data

(63) Continuation of application No. 16/128,206, filed on Sep. 11, 2018, now Pat. No. 11,086,387.

(Continued)

(51) Int. Cl.
*G06F 1/3287* (2019.01)
*G06F 1/3212* (2019.01)
(Continued)

(52) U.S. Cl.
CPC .......... *G06F 1/3287* (2013.01); *G06F 1/3212* (2013.01); *H04L 43/062* (2013.01);
(Continued)

(58) Field of Classification Search
None
See application file for complete search history.

(56) References Cited

U.S. PATENT DOCUMENTS 8,459,560 B1 * 6/2013 Mineo-Goggin ...........................
G06Q 20/3223
235/487
9,026,047 B2    5/2015 Royston
(Continued)

FOREIGN PATENT DOCUMENTS

CN    105048621 A    11/2015
CN    105452987 A    3/2016
(Continued)

OTHER PUBLICATIONS

International Preliminary Report on Patentability from PCT/US2019/024271, dated Dec. 17, 2020, 7 pages.
(Continued)

*Primary Examiner* — Fahmida Rahman
(74) *Attorney, Agent, or Firm* — BAKERHOSTETLER

(57) ABSTRACT

Systems, methods, and computer-readable media for managing near field communications during a low power express mode of an electronic device are provided that may make credentials of a near field communication ("NFC") component appropriately secure and appropriately accessible while also limiting the power consumption of the NFC component and of other components of the electronic device.

20 Claims, 10 Drawing Sheets

Related U.S. Application Data

(60) Provisional application No. 62/679,909, filed on Jun. 3, 2018.

(51) Int. Cl.
*H04L 12/26* (2006.01)
*H04L 29/06* (2006.01)
*H04L 43/062* (2022.01)
*H04L 43/0829* (2022.01)
*H04L 43/087* (2022.01)
*H04L 65/75* (2022.01)
*H04L 65/80* (2022.01)
*H04W 4/80* (2018.01)
*H04W 24/08* (2009.01)

(52) U.S. Cl.
CPC ........ *H04L 43/0829* (2013.01); *H04L 43/087* (2013.01); *H04L 65/762* (2022.05); *H04L 65/80* (2013.01); *H04W 4/80* (2018.02); *H04W 24/08* (2013.01)

(56) References Cited

U.S. PATENT DOCUMENTS

| | | | |
|---|---|---|---|
| 9,064,253 | B2 | 6/2015 | Royston |
| 9,787,366 | B1 | 10/2017 | Shirani-Mehr et al. |
| 10,218,412 | B1* | 2/2019 | Koeppel .......... H04W 4/80 |
| 2011/0047621 | A1 | 2/2011 | Brando |
| 2012/0298760 | A1 | 11/2012 | Li et al. |
| 2013/0005245 | A1 | 1/2013 | Royston |
| 2013/0084803 | A1 | 4/2013 | Hall |
| 2013/0179964 | A1* | 7/2013 | Zawacki .......... G06F 21/31 726/16 |
| 2013/0308520 | A1 | 11/2013 | Damnjanovic et al. |
| 2015/0044964 | A1 | 2/2015 | Khan |
| 2015/0178723 | A1 | 6/2015 | Khan et al. |
| 2015/0287025 | A1 | 10/2015 | Royston |
| 2015/0324791 | A1 | 11/2015 | Khan |
| 2015/0334518 | A1 | 11/2015 | Hall et al. |
| 2018/0374443 | A1 | 12/2018 | Kuei |
| 2019/0068247 | A1 | 2/2019 | Hueber |

FOREIGN PATENT DOCUMENTS

| | | |
|---|---|---|
| CN | 105706131 A | 6/2016 |
| CN | 106227324 A | 12/2016 |
| CN | 106471531 A | 3/2017 |
| EP | 2626811 | 8/2013 |
| WO | WO 2010/008251 | 1/2010 |

OTHER PUBLICATIONS

European Office Action from European Patent Application No. 19717398.2, dated Feb. 8, 2023, 6 pages.

Deng, "Studies and Application Status Based on RFID Technology," Technique & Education, 2016, vol. 30, No. 4, 4 pages including English language abstract.

Chinese Office Action from Chinese Patent Application No. 201980042196.1, dated Dec. 15, 2023, 19 pages including machine-generated English language translation.

Chinese Notice of Allowance from Chinese Patent Application No. 201980042196.1, dated May 20, 2024, 5 pages including machine-generated English language translation.

European Office Action from European Patent Application No. 19717398.2, dated Dec. 5, 2024, 8 pages.

* cited by examiner

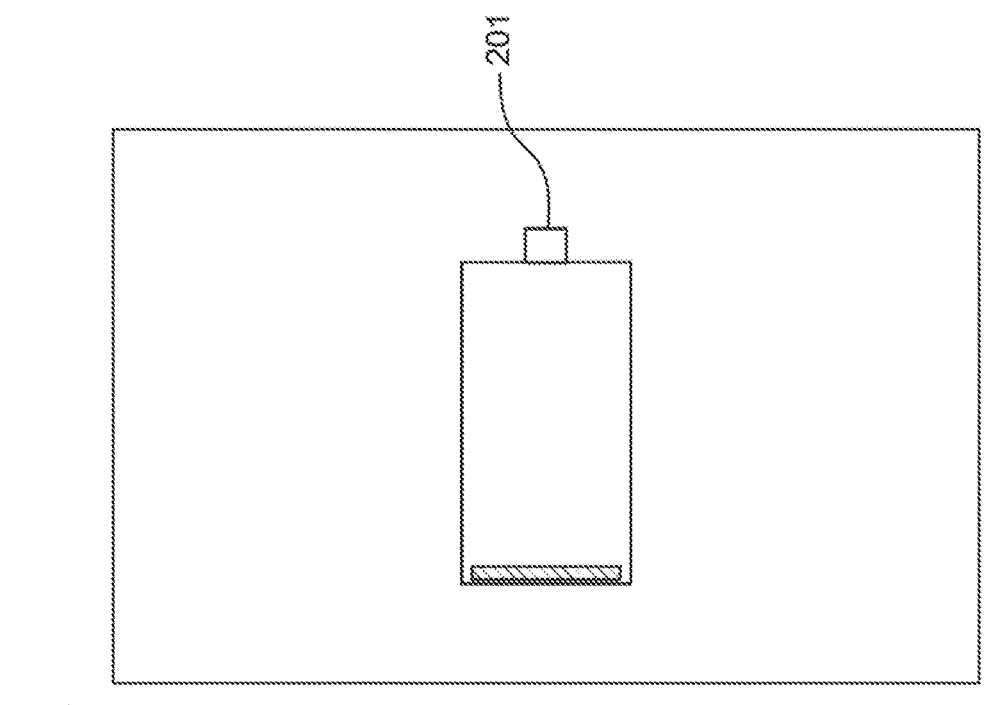
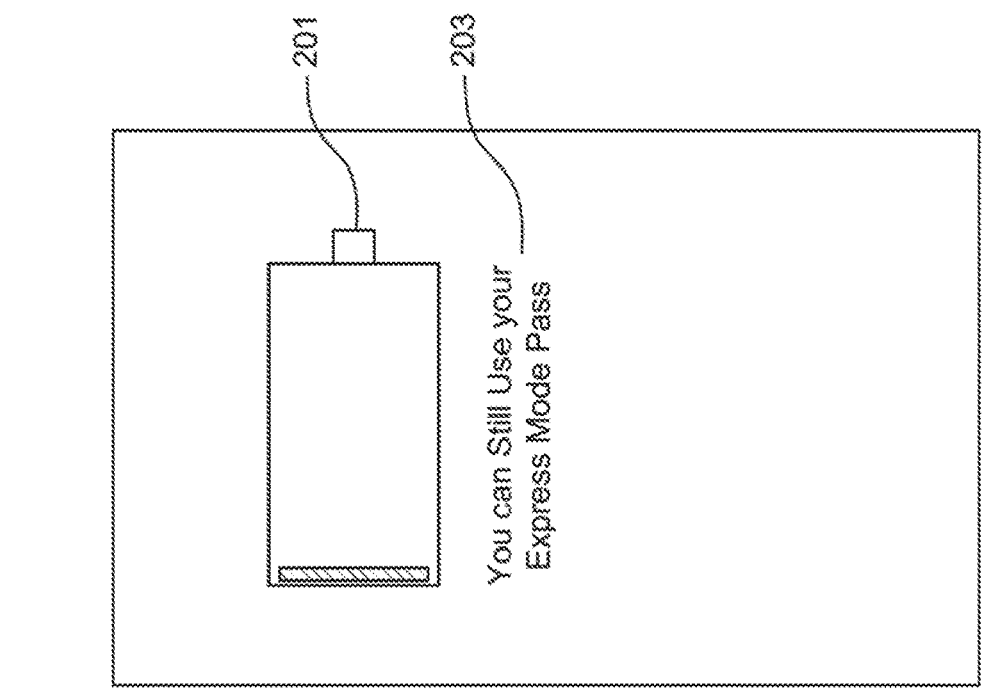
FIG. 2A
FIG. 2B

MANAGEMENT OF NEAR FIELD COMMUNICATIONS USING A LOW POWER EXPRESS MODE OF AN ELECTRONIC DEVICE

CROSS-REFERENCE TO RELATED APPLICATION(S)

This application is a continuation of U.S. patent application Ser. No. 16/128,206, filed Sep. 11, 2018, which claims the benefit of prior filed U.S. Provisional Patent Application No. 62/679,909, filed Jun. 3, 2018, each of which is hereby incorporated by reference herein in its entirety.

TECHNICAL FIELD

This disclosure relates to the management of near field communications and, more particularly, to the management of near field communications using a low power express mode of an electronic device.

BACKGROUND OF THE DISCLOSURE

Portable electronic devices (e.g., cellular telephones) may be provided with near field communication ("NFC") components for enabling contactless proximity-based communications with another entity. Often times, these communications are associated with currency transactions or other secure data transactions that users rely on every day, such as credit card payments and public transportation ticketing. However, due to the limited amount of power available to battery operated devices, the NFC capabilities of such devices are often compromised or rendered unusable when their available power drops below certain thresholds.

SUMMARY OF THE DISCLOSURE

This document describes systems, methods, and computer-readable media for managing power usage in a device that is capable of near field communications and/or other wireless communications technologies.

As an example, a method for operating an electronic device that includes a near field communication component may be provided that includes, while the electronic device is operating in a normal power mode of the electronic device, during which the near field communication component is operating in a full power mode of the near field communication component, detecting a low power mode initiation event with the electronic device, and, in response to the detecting, determining a status of a low power mode flag (LPMF) of the electronic device, and transitioning the electronic device from operating in the normal power mode of the electronic device to operating in a low power mode of the electronic device, wherein the transitioning the electronic device includes disabling a plurality of subsystems of the electronic device, transitioning the near field communication component from operating in the full power mode of the near field communication component to operating in a low power mode of the near field communication component when the determined status of the LPMF is a first status, and transitioning the near field communication component from operating in the full power mode of the near field communication component to operating in an off mode of the near field communication component when the determined status of the LPMF is a second status that is different than the first status, wherein the near field communication component uses less power when operating in the off mode of the near field communication component than when operating in the low power mode of the near field communication component.

As another example, a method for operating an electronic device that includes a communication component and a power supply may be provided that includes detecting a low power mode initiation event with the electronic device and, in response to the detecting, disabling at least one of a power management unit of the electronic device or an operating system of the electronic device, when at least one express mode credential is available on the electronic device, providing power from the power supply to the communication component for enabling the communication component to communicate data from the at least one express mode credential to a remote terminal, and, when no express mode credential is available on the electronic device, preventing the communication component from receiving any power from the power supply.

As yet another example, a method for operating an electronic device that includes a communication component, a memory register, and a battery may be provided that includes detecting that a charge of the battery is below a predetermined threshold and, in response to the detecting, disabling a plurality of subsystems of the electronic device, when the status of the memory register is a first status, providing power from the battery to the communication component for enabling the communication component to communicate data with a remote terminal, and, when the status of the memory register is a second status that is different than the first status, preventing the communication component from receiving any power from the battery.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIGS. 2A and 2B are front views of exemplary screens of a graphical user interface of the electronic device of FIGS. 1 and 2 illustrating processes for managing near field communications;

DETAILED DESCRIPTION OF THE DISCLOSURE

Systems, methods, and computer-readable media may be provided for managing near field communications. Near field communications may be managed differently according to different power management modes of an electronic device. In certain low power management modes, certain components of an electronic device may be at least partially disabled or shut down to conserve power. When an electronic device operates in these modes, credentials (e.g., payment credentials) of an NFC component in the device may be appropriately secure and/or appropriately accessible, while power consumption of the NFC component is limited or reduced. For example, while in a low powered operating state at which both a system power management unit ("PMU") and any device operating system may be off or disabled or inactive, an electronic device may be operative to carry out one or more NFC transactions using one or more specific credentials (e.g., credentials previously designated as express mode cards) and provide any suitable output that may be operative to indicate such an attempted or completed transaction to a user of the device. Various transitions between power management states may be accomplished using a system PMU and a boot loader application of the electronic device but not a full operating system application, such that significant power savings may be realized, while certain actions within a state, such as an NFC transaction within a low power management state, which may include generating a haptic or other user detectable output, may be accomplished without even using a system PMU or loading any application for realizing additional power savings while also securely enabling certain NFC transactions for improving user convenience.

Figure 1:
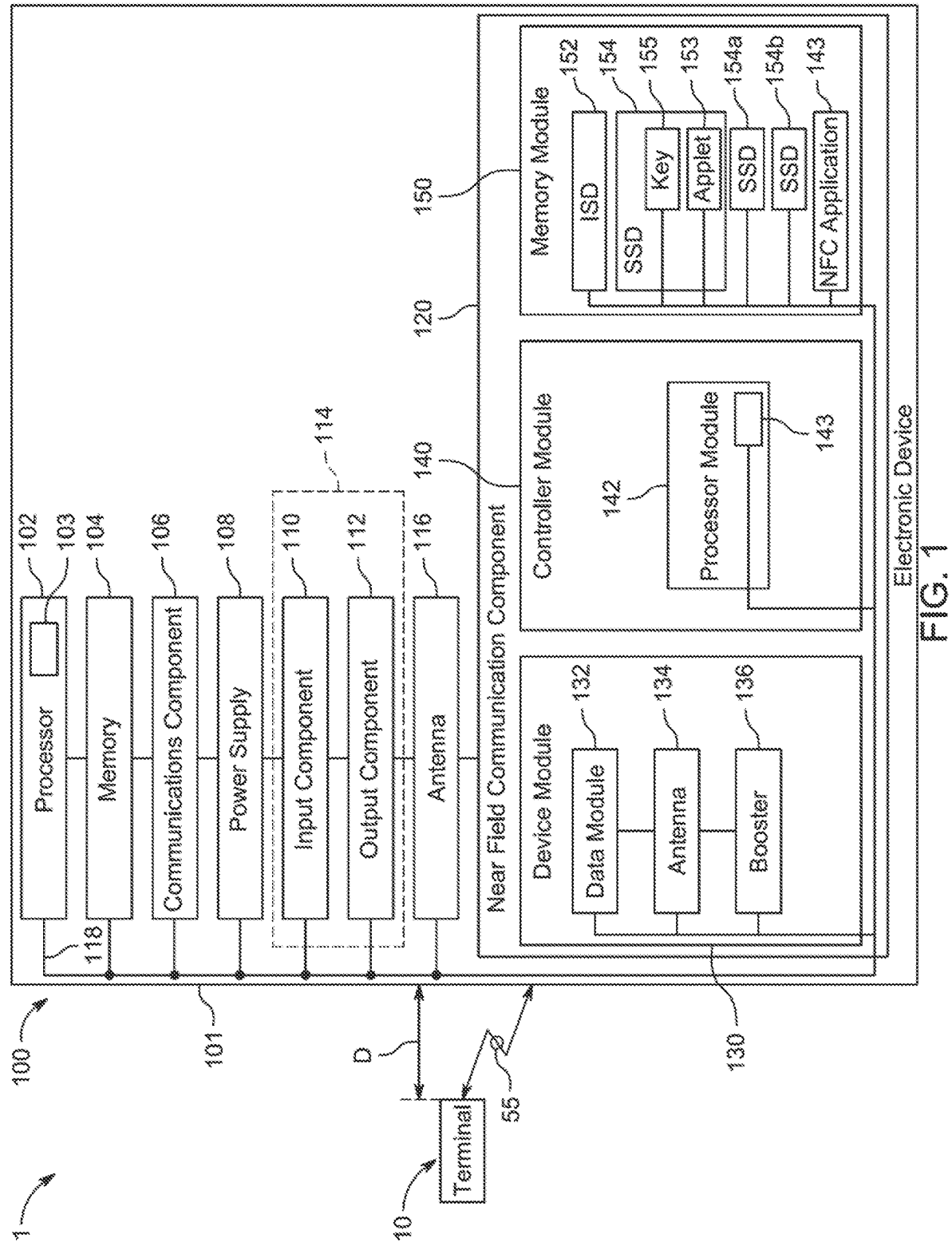
FIG. 1 is a schematic view of an illustrative system that includes an electronic device for managing near field communications.

FIG. 1 is a schematic view of an illustrative communications system 1 that may include a terminal 10 and an electronic device 100 for managing near field communications 55 with terminal 10 in accordance with some embodiments. Electronic device 100 can include, but is not limited to, a music player (e.g., an iPod™ available by Apple Inc. of Cupertino, California), video player, still image player, game player, other media player, music recorder, movie or video camera or recorder, still camera, other media recorder, radio, medical equipment, domestic appliance, transportation vehicle instrument, musical instrument, calculator, cellular telephone (e.g., an iPhone™ available by Apple Inc.), other wireless communication device, personal digital assistant, remote control, pager, computer (e.g., a desktop, laptop, tablet (e.g., an iPad™ available by Apple Inc.), server, etc.), monitor, television, stereo equipment, set up box, set-top box, boom box, modem, router, printer, or any combination thereof. In some embodiments, electronic device 100 may perform a single function (e.g., a device dedicated to managing near field communications) and, in other embodiments, electronic device 100 may perform multiple functions (e.g., a device that manages near field communications, plays music, and receives and transmits telephone calls).

Electronic device 100 may be any portable, mobile, hand-held, or miniature electronic device that may be configured to manage near field communications wherever a user travels. Some miniature electronic devices may have a form factor that is smaller than that of hand-held electronic devices, such as an iPod™. Illustrative miniature electronic devices can be integrated into various objects that may include, but are not limited to, watches (e.g., an Apple Watch™ available by Apple Inc.), rings, necklaces, belts, accessories for belts, headsets, accessories for shoes, virtual reality devices, glasses, other wearable electronics, accessories for sporting equipment, accessories for fitness equipment, key chains, or any combination thereof. Alternatively, electronic device 100 may not be portable at all, but may instead be generally stationary.

As shown in FIG. 1, for example, electronic device 100 may include a processor 102, memory 104, communications component 106, power supply 108, input component 110, output component 112, antenna 116, and near field communication ("NFC") component 120. Electronic device 100 may also include a bus 118 that may provide one or more wired or wireless communication links or paths for transferring data and/or power to, from, or between various other components of device 100. In some embodiments, one or more components of electronic device 100 may be combined or omitted. Moreover, electronic device 100 may include other components not combined or included in FIG. 1. For example, electronic device 100 may include motion-sensing circuitry, a compass, any other suitable components, or several instances of the components shown in FIG. 1. For the sake of simplicity, only one of each of the components is shown in FIG. 1.

Memory 104 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may be fixedly embedded within electronic device 100 or may be incorporated onto one or more suitable types of cards that may be repeatedly inserted into and removed from electronic device 100 (e.g., a subscriber identity module ("SIM") card or secure digital ("SD") memory card). Memory 104 may store media data (e.g., music and image files), software (e.g., for implementing functions on device 100), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 100 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications component 106 may be provided to allow device 100 to communicate with one or more other electronic devices or servers using any suitable communications protocol. For example, communications component 106 may support Wi-Fi (e.g., an 802.11 protocol), ZigBee (e.g., an 802.15.4 protocol), WiDi™, Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), Stream Control Transmission Protocol ("SCTP"), Dynamic Host Configuration Protocol ("DHCP"), hypertext transfer protocol ("HTTP"), BitTorrent™, file transfer protocol ("FTP"), real-time transport protocol ("RTP"), real-time streaming protocol ("RTSP"), real-time control protocol ("RTCP"), Remote Audio Output Protocol ("RAOP"), Real Data Transport Protocol™ ("RDTP"), User Datagram Protocol ("UDP"), secure shell protocol ("SSH"), wireless distribution system ("WDS") bridging, any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any communications protocol that may be used by a low power Wireless Personal Area Network ("6LoW-PAN") module, any suitable cellular communications protocol (e.g., broadband cellular network technologies (e.g., 3G, 4G, 5G, etc.)), any other communications protocol, or any combination thereof. Communications component 106 may also include or be electrically coupled to any suitable transceiver circuitry (e.g., transceiver circuitry or antenna 116 via bus 118) that can enable device 100 to be communicatively coupled to another device (e.g., a host computer or an accessory device) and communicate with that other device wirelessly, or via a wired connection (e.g., using a connector port). Communications component 106 may be configured to determine a geographical position of electronic device 100. For example, communications component 106 may utilize the global positioning system ("GPS") or a regional or site-wide positioning system that may use cell tower positioning technology or Wi-Fi technology.

Power supply 108 can include any suitable circuitry for receiving and/or generating power, and for providing such power to one or more of the other components of electronic device 100. For example, power supply 108 can be coupled to a power grid (e.g., when device 100 is not acting as a portable device or when a battery of the device is being charged at an electrical outlet with power generated by an electrical power plant). As another example, power supply 108 can be configured to generate power from a natural source (e.g., solar power using solar cells). As another example, power supply 108 can include one or more batteries for providing power (e.g., when device 100 is acting as a portable device). For example, power supply 108 can include one or more of a battery (e.g., a gel, nickel metal hydride, nickel cadmium, nickel hydrogen, lead acid, or lithium-ion battery), an uninterruptible or continuous power supply ("UPS" or "CPS"), and circuitry for processing power received from a power generation source (e.g., power generated by an electrical power plant and delivered to the user via an electrical socket or otherwise). The power can be provided by power supply 108 as alternating current or direct current, and may be processed to transform power or limit received power to particular characteristics. For example, the power can be transformed to or from direct current, and constrained to one or more values of average power, effective power, peak power, energy per pulse, voltage, current (e.g., measured in amperes), or any other characteristic of received power. Power supply 108 can be operative to request or provide particular amounts of power at different times, for example, based on the needs or requirements of electronic device 100 or periphery devices that may be coupled to electronic device 100 (e.g., to request more power when charging a battery than when the battery is already charged).

One or more input components 110 may be provided to permit a user to interact or interface with device 100. For example, input component 110 can take a variety of forms, including, but not limited to, a touch pad, dial, click wheel, scroll wheel, touch screen, one or more buttons (e.g., a keyboard), mouse, joy stick, track ball, microphone, camera, scanner (e.g., a bar code scanner or any other suitable scanner that may obtain product identifying information from a code, such as a bar code, a QR code, or the like), proximity sensor, light detector, motion sensor, biometric sensor (e.g., a fingerprint reader or other feature recognition sensor, which may operate in conjunction with a feature-processing application that may be accessible to electronic device 100 for authenticating a user), and combinations thereof. Each input component 110 can be configured to provide one or more dedicated control functions for making selections or issuing commands associated with operating device 100.

Electronic device 100 may also include one or more output components 112 that may present information (e.g., graphical, audible, and/or tactile information) to a user of device 100. For example, output component 112 of electronic device 100 may take various forms, including, but not limited to, audio speakers, headphones, audio line-outs, visual displays, antennas, infrared ports, rumblers, vibrators, any other suitable haptic elements, or combinations thereof.

As a specific example, electronic device 100 may include a display output component as an output component 112. Such a display output component may include any suitable type of display or interface for presenting visual data to a user. A display output component may include a display embedded in device 100 or coupled to device 100 (e.g., a removable display). A display output component may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, a display output component can include a movable display or a projecting system for providing a display of content on a surface remote from electronic device 100, such as, for example, a video projector, a head-up display, or a three-dimensional (e.g., holographic) display. As another example, a display output component may include a digital or mechanical viewfinder, such as a viewfinder of the type found in compact digital cameras, reflex cameras, or any other suitable still or video camera. A display output component may include display driver circuitry, circuitry for driving display drivers, or both, and such a display output component can be operative to display content (e.g., media playback information, application screens for applications implemented on electronic device 100, information regarding ongoing communications operations, information regarding incoming communications requests, device operation screens, etc.) that may be under the direction of processor 102.

It should be noted that one or more input components and one or more output components may sometimes be referred to collectively herein as an input/output ("I/O") component or I/O interface (e.g., input component 110 and output component 112 as I/O component or I/O interface 114). For example, input component 110 and output component 112 may sometimes be a single I/O component 114, such as a touch screen, that may receive input information through a user's touch of a display screen and that may also provide visual information to a user via that same display screen.

Processor 102 of electronic device 100 may include any processing circuitry that may be operative to control the operations and performance of one or more components of electronic device 100. For example, processor 102 may receive input signals from input component 110 and/or drive output signals through output component 112. As shown in FIG. 1, processor 102 may be used to run one or more applications, such as an application 103. Application 103 may include, but is not limited to, one or more operating system applications, firmware applications, media playback applications, media editing applications, NFC low power mode applications, biometric feature-processing applications, or any other suitable applications. For example, processor 102 may load application 103 as a user interface program to determine how instructions or data received via an input component 110 or other component of device 100 may manipulate the way in which information may be stored and/or provided to the user via an output component 112. Application 103 may be accessed by processor 102 from any suitable source, such as from memory 104 (e.g., via bus 118) or from another device or server (e.g., via communications component 106). Processor 102 may include a single processor or multiple processors. For example, processor 102 may include at least one "general purpose" microprocessor, a combination of general and special purpose microprocessors, instruction set processors, graphics processors, video processors, and/or related chips sets, and/or special purpose microprocessors. Processor 102 also may include on board memory for caching purposes.

Electronic device 100 may also include near field communication ("NFC") component 120. NFC component 120 may be any suitable proximity-based communication mechanism that may enable contact-less transactions or communications 55 between electronic device 100 and terminal 10 (e.g., a payment terminal). NFC component 120 may allow for close range communication at relatively low data rates (e.g., 424 kbps), and may comply with any suitable standards, such as ISO/IEC 7816, ISO/IEC 18092, ECMA-340, ISO/IEC 21481, ECMA-352, ISO 14443, and/or ISO 15693. Alternatively or additionally, NFC component 120 may allow for close range communication at relatively high data rates (e.g., 560 Mbps), and may comply with any suitable standards, such as the TransferJet™ protocol. Communication between NFC component 120 and terminal 10 may occur within any suitable close range distance D between device 100 and terminal 10, such as a range of approximately 2 to 4 centimeters (or any other distance greater than 4 centimeters or less than 2 centimeters), and may operate at any suitable frequency (e.g., 13.56 MHz). For example, such close range communication of NFC component 120 may take place via magnetic field induction, which may allow NFC component 120 to communicate with other NFC devices and/or to retrieve information from tags having radio frequency identification ("RFID") circuitry. NFC component 120 may provide a manner of acquiring merchandise information, transferring payment information, and otherwise communicating with an external device (e.g., terminal 10).

NFC component 120 may include any suitable modules for enabling contactless proximity-based communication 55 between electronic device 100 and terminal 10. As shown in FIG. 1, for example, NFC component 120 may include an NFC device module 130, an NFC controller module 140, and an NFC memory module 150.

NFC device module 130 may include an NFC data module 132, an NFC antenna 134, and an NFC booster 136. NFC data module 132 may be configured to contain, route, or otherwise provide any suitable data that may be transmitted by NFC component 120 to terminal 10 as part of a contactless proximity-based or NFC communication 55. Additionally or alternatively, NFC data module 132 may be configured to contain, route, or otherwise receive any suitable data that may be received by NFC component 120 from terminal 10 as part of a contactless proximity-based communication 55.

NFC transceiver or NFC antenna 134 may be any suitable antenna or other suitable transceiver circuitry that may generally enable communication of communication 55 from NFC data module 132 to terminal 10 and/or to NFC data module 132 from terminal 10. Therefore, NFC antenna 134 (e.g., a loop antenna) may be provided specifically for enabling the contactless proximity-based communication capabilities of NFC component 120.

Alternatively or additionally, NFC component 120 may utilize the same transceiver circuitry or antenna (e.g., antenna 116) that another communication component of electronic device 100 (e.g., communication component 106) may utilize. For example, communication component 106 may leverage antenna 116 to enable Wi-Fi, Bluetooth™, or GPS communication between electronic device 100 and another remote entity, while NFC component 120 may leverage antenna 116 to enable contactless proximity-based or NFC communication 55 between NFC data module 132 of NFC device module 130 and another entity (e.g., terminal 10). In such embodiments, NFC device module 130 may include NFC booster 136, which may be configured to provide appropriate signal amplification for data of NFC component 120 (e.g., data within NFC data module 132) so that such data may be appropriately transmitted by shared antenna 116 as communication 55 to terminal 10. For example, shared antenna 116 may require amplification from booster 136 before antenna 116 (e.g., a non-loop antenna) may be properly enabled for communicating contactless proximity-based or NFC communication 55 between electronic device 100 and terminal 10 (e.g., more power may be needed to transmit NFC data using antenna 116 than may be needed to transmit other types of data using antenna 116).

NFC controller module 140 may include at least one NFC processor module 142. NFC processor module 142 may operate in conjunction with NFC device module 130 to enable, activate, allow, and/or otherwise control NFC component 120 for communicating NFC communication 55 between electronic device 100 and terminal 10. NFC processor module 142 may exist as a separate component, may be integrated into another chipset, or may be integrated with processor 102, for example, as part of a system on a chip ("SoC"). As shown in FIG. 1, NFC processor module 142 of NFC controller module 140 may be used to run one or more applications, such as an NFC low power mode or wallet application 143 that may help dictate the function of NFC component 120. Application 143 may include, but is not limited to, one or more operating system applications, firmware applications, NFC low power applications, or any other suitable applications that may be accessible to NFC component 120 (e.g., application 103). NFC controller module 140 may include one or more protocols, such as the Near Field Communication Interface and Protocols ("NFCIP-1"), for communicating with another NFC device (e.g., terminal 10). The protocols may be used to adapt the communication speed and to designate one of the connected devices as the initiator device that controls the near field communication.

NFC controller module 140 may control the near field communication mode of NFC component 120. For example, NFC processor module 142 may be configured to switch NFC device module 130 between a reader/writer mode for reading information (e.g., communication 55) from NFC tags (e.g., from terminal 10) to NFC data module 132, a peer-to-peer mode for exchanging data (e.g., communication 55) with another NFC enabled device (e.g., terminal 10), and a card emulation mode for allowing another NFC enabled device (e.g., terminal 10) to read information (e.g., communication 55) from NFC data module 132. NFC controller module 140 also may be configured to switch NFC component 120 between active and passive modes. For example, NFC processor module 142 may be configured to switch NFC device module 130 (e.g., in conjunction with NFC antenna 134 or shared antenna 116) between an active mode where NFC device module 130 may generate its own RF field and a passive mode where NFC device module 130 may use load modulation to transfer data to another device generating an RF field (e.g., terminal 10). Operation in such a passive mode may prolong the battery life of electronic device 100 compared to operation in such an active mode. The modes of NFC device module 130 may be controlled based on preferences of a user and/or based on preferences of a manufacturer of device 100, which may be defined or otherwise dictated by an application running on device 100 (e.g., application 103 and/or application 143).

NFC memory module 150 may operate in conjunction with NFC device module 130 and/or NFC controller module 140 to allow for NFC communication 55 between electronic device 100 and terminal 10. NFC memory module 150 may be embedded within NFC device hardware or within an NFC integrated circuit ("IC"). NFC memory module 150 may be tamper resistant and may include at least a portion of a secure element. For example, NFC memory module 150 may store one or more applications relating to NFC communications (e.g., application 143) that may be accessed by NFC controller module 140. For example, such applications may include financial payment applications, secure access system applications, loyalty card applications, and other applications, which may be encrypted. In some embodiments, NFC controller module 140 and NFC memory module 150 may independently or in combination provide a dedicated microprocessor system that may contain an operating system, memory, application environment, and security protocols intended to be used to store and execute sensitive applications on electronic device 100. NFC memory module 150 may be a portion of memory 106 or at least one dedicated chip specific to NFC component 120. NFC memory module 150 may reside on a SIM, a dedicated chip on a motherboard of electronic device 100, or as an external plug in memory card. NFC memory module 150 may be completely independent from NFC controller module 140 and may be provided by different components of device 100 and/or provided to electronic device 100 by different removable subsystems.

NFC memory module 150 may include one or more of an issuer security domain ("ISD") 152 and a supplemental security domain ("SSD") 154 (e.g., a service provider security domain ("SPSD"), a trusted service manager security domain ("TSMSD"), etc.), which may be defined and managed by an NFC specification standard (e.g., GlobalPlatform). For example, ISD 152 may be a portion of NFC memory module 150 in which a trusted service manager ("TSM") or issuing financial institution may store keys and/or other suitable information for creating or otherwise provisioning one or more credentials (e.g., credentials associated with various credit cards, bank cards, gift cards, access cards, transit passes, etc.) on electronic device 100 (e.g., via communications component 106), for credential content management, and/or security domain management. A specific supplemental security domain ("SSD") 154 (e.g., one of SSDs 154-154b) may be associated with a specific credential (e.g., a specific credit card credential or a specific public transit card credential or a specific space (e.g., building) access card credential) that may provide specific privileges or payment rights to electronic device 100. Each SSD 154 may have its own manager key 155 for its own application or applet 153 that may need to be activated to enable a specific credential of that SSD 154 for use by NFC device module 130 as an NFC communication 55. For example, a particular SSD 154 may be associated with a particular credit card credential. However, that particular credential may only be communicated as an NFC communication 55 to terminal 10 by NFC component 120 (e.g., that particular credential may only be accessible by NFC data module 132) when a particular applet 153 of that particular SSD 154 has been enabled or otherwise activated or unlocked for such use. Security features may be provided for enabling use of NFC component 120 that may be particularly useful when transmitting payment information, such as credit card information or bank account information to terminal 10. Such security features also may include a secure storage area that may have restricted access. For example, user authentication via personal identification number ("PIN") entry or via user interaction with a biometric sensor may need to be provided to access the secure storage area. In certain embodiments, some or all of the security features may be stored within NFC memory module 150. Further, security information, such as an authentication key, for communicating with terminal 10 may be stored within NFC memory module 150. In certain embodiments, NFC memory module 150 may include a microcontroller embedded within electronic device 100.

Terminal 10 may include a reader for detecting, reading, or otherwise receiving NFC communication 55 from electronic device 100 (e.g., when electronic device 100 comes within a certain distance or proximity D of terminal 10). Accordingly, it is noted that NFC communication 55 between terminal 10 and electronic device 100 may occur wirelessly and, as such, may not require a clear "line of sight" between the respective devices. As mentioned, NFC device module 130 may be passive or active. When passive, NFC device module 130 may only be activated when within a response range D of a suitable reader of terminal 10. For instance, a reader of terminal 10 may emit a relatively low-power radio wave field that may be used to power an antenna utilized by NFC device module 130 (e.g., shared antenna 116 or NFC-specific antenna 134) and, thereby, enable that antenna to transmit suitable NFC communication information (e.g., transit card credential information) from NFC data module 132, via antenna 116 or antenna 134, to terminal 10 as NFC communication 55. When active, NFC device module 130 may incorporate or otherwise have access to a power source local to electronic device 100 (e.g., power supply 108) that may enable shared antenna 116 or NFC-specific antenna 134 to actively transmit NFC communication information (e.g., transit card credential information) from NFC data module 132, via antenna 116 or antenna 134, to terminal 10 as NFC communication 55, rather than reflect radio frequency signals, as in the case of a passive NFC device module 130.

While NFC component 120 has been described with respect to near field communication, it is to be understood that component 120 may be configured to provide any suitable contactless proximity-based mobile payment or any other suitable type of contactless proximity-based communication 55 between electronic device 100 and terminal 10. For example, NFC component 120 may be configured to provide any suitable short-range communication, such as those involving electromagnetic/electrostatic coupling technologies.

Electronic device 100 may also be provided with a housing 101 that may at least partially enclose one or more of the components of device 100 for protection from debris and other degrading forces external to device 100. In some embodiments, one or more of the components may be provided within its own housing (e.g., input component 110 may be an independent keyboard or mouse within its own housing that may wirelessly or through a wire communicate with processor 102, which may be provided within its own housing).

Figure 1A:
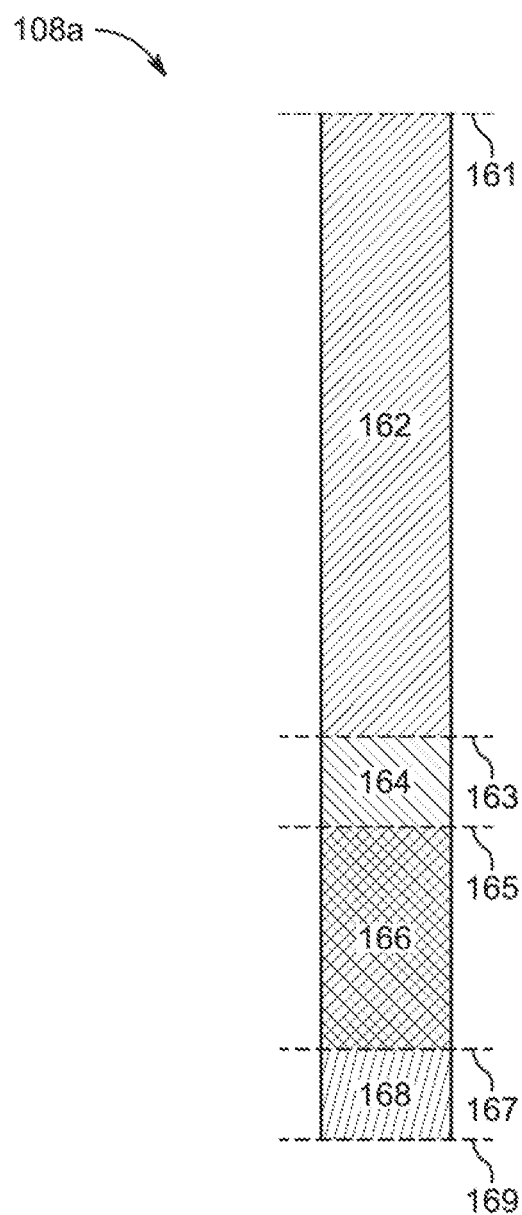
FIG. 1A is an exemplary battery chart detailing various battery state-of-charge thresholds of an exemplary battery of the electronic device of FIG. 1.

FIG. 1A illustrates an exemplary battery chart 108a detailing various potential state-of-charge thresholds of an exemplary power supply 108 (e.g., an exemplary battery) of electronic device 100. Specifically, FIG. 1A illustrates how different operating modes of device 100 may be enabled based on the amount of energy that may be remaining in power supply 108, as battery chart 108a may represent the actual energy left in a battery of power supply 108, where chart 108a may detail various possible levels and thresholds that device 100 may incorporate into its operation. For example, as shown, battery chart 108a may include a first or full operating charge level range 162 that may be any charge level between a maximum threshold charge level 161 and a first switching threshold or software threshold or low power express mode ("LPEM")-on threshold charge level 163, a second or high battery trap or LPEM operating charge level range 164 that may be any charge level between LPEM-on threshold charge level 163 and a second switching threshold or low power or LPEM-off threshold charge level 165, a third or low battery trap operating charge level range 166 that may be any charge level between LPEM-off threshold charge level 165 and a third switching threshold or overdischarge lockout ("ODL") threshold charge level 167, and a fourth or disconnect operating charge level range 168 that may be any charge level between ODL threshold charge level 167 and a minimum threshold charge level 169.

When the charge level of power supply 108 is in full operating charge level range 162, device 100 may usually be configured to operate in a full or normal operating mode, which may allow device 100 to perform functions such as place telephone calls, connect to Wi-Fi, play media files, and/or any other suitable functions that may be a normal functionality of device 100 (e.g., by configuring NFC component 120 to be in an NFC full power mode). LPEM-on threshold charge level 163 may be provided in order to limit the current output of power supply 108 once the battery charge has dropped to or below that threshold charge level 163. Upon the battery charge decreasing to at least that threshold charge level 163 and to no less than ODL threshold charge level 167, such that the charge level of power supply 108 is in LPEM operating charge level range 164 or in low battery trap operating charge level range 166, device 100 may usually be configured to operate in a battery trap operating mode, which may allow device 100 to perform limited functions by providing power to only certain components for limited purposes (e.g., to perform emergency or high priority functionalities) while preventing certain power intensive functionalities, such as by disabling one, some, or all input components, output components, communications components, applications, and/or the like (e.g., to mitigate discharge of the battery (e.g., to prevent battery swell, loss of capacity, etc.)). For example, while operating in the battery trap operating mode, which may also be referred to herein as a normal off operating mode, device 100 may be configured to require an external power supply to assist device 100 in harvesting power when starting up again but may be able to start up or power up immediately in response to being charged by an external power supply in a way that provides full functionality of device 100. The charge remaining during the battery trap operating mode may be any charge level of power supply 108 that is in LPEM operating charge level range 164 or in low battery trap operating charge level range 166. However, should the charge level of power supply 108 fall below ODL threshold charge level 167, device 100 may not be able to start up or power up immediately in response to being charged by an external power supply in a way that provides full functionality of device 100, but instead may first require receiving a significant amount of such external power supply before being able to start up in a way that provides full functionality to device 100. For example, fast universal serial bus ("USB") charging may be enabled immediately if the charge level of power supply 108 is not below ODL threshold charge level 167, yet fast USB charging may be delayed until after a certain amount of external power has charged power supply 108 up above the charge level of ODL threshold charge level 167. Unlike in the full or normal operating mode of charge level range 162, where there may be sufficient energy remaining in power supply 108 to power up all of the components of device 100 (e.g., at their normal operating frequencies), in the battery trap operating mode(s) of charge level(s) 164 and/or 166 there may not be sufficient energy remaining in power supply 108 to power up all of the sub-components of device 100 (e.g., at their normal operating frequencies), but there may be enough energy remaining in power supply 108 to run a subset of the components (e.g., a processor, a communications component (e.g., NFC component 120), an output component (e.g., a display and/or a haptic component), an input component (e.g., a mechanical button), etc.) of device 100 (e.g., at their reduced operating frequencies) for a limited amount of time.

Upon the battery charge decreasing to at least LPEM-on threshold charge level 163 and to no less than LPEM-off threshold charge level 165, such that the charge level of power supply 108 is in LPEM operating charge level range 164, device 100 may be configured to operate in a high battery trap or LPE operating mode, which may allow device 100 to perform limited functions with NFC communication component 120 by situationally providing power to NFC communication component 120 and configuring NFC communication component 120 to carry out certain actions while device 100 is operating in the LPE operating mode (e.g., by configuring NFC component 120 to be in an NFC low power mode or NFC low power express mode in which NFC component 120 may be enabled to carry out one or more LPEM NFC transactions). However, upon the battery charge decreasing to at least LPEM-off threshold charge level 165 and to no less than ODL threshold charge level 167, such that the charge level of power supply 108 is in low battery trap operating charge level range 166, device 100 may be configured to operate in a low battery trap operating mode, which may allow device 100 to perform certain limited functions but without providing power to NFC communication component 120 (e.g., by configuring NFC component 120 to be in an NFC OFF mode in which NFC component 120 may not be enabled to carry out any NFC transactions). Starting up a limited subset of components in a battery trap operating mode (e.g., of charge level 164 and/or of charge level 166) may cause spikes in the current drawn from the PMU and power supply. As the power supply charge level decreases, its ability to cope with those surges may decrease to the point where turning on a component may cause the voltage being supplied to the device to fall below the level at which the device can operate, thereby causing it to crash or behave erratically. LPEM-off threshold charge level 165 may be defined to avoid this with respect to turning on NFC component 120 (e.g., the limiting factor may be the ability to power NFC component 120 sufficiently so that it can communicate with terminal 10). ODL threshold charge level 167 may be provided in order to terminate the current output of power supply 108 once the battery charge has dropped to or below that threshold charge level 167. Upon the battery charge decreasing to at least that threshold charge level 167, such that the charge level of power supply 108 is in disconnect operating charge level range 168, device 100 may be configured to disconnect power supply 108 from any or all non-required internal discharge components to prevent any further discharge (e.g., to prevent over discharge) of the battery of power supply 108 (e.g., to operate in a power disconnect operating mode). As mentioned, starting up a limited subset of components in a battery trap operating mode (e.g., of charge level 164 and/or of charge level 166) may cause spikes in the current drawn from the PMU and power supply. As the power supply charge level decreases, its ability to cope with those surges may decrease to the point where turning on a component may cause the voltage being supplied to the device to fall below the level at which the device can operate, thereby causing it to crash or behave erratically. ODL threshold charge level 167 may be defined to avoid this with respect to turning on any device component (e.g., the limiting factor may be the ability to power any component other than already disabled NFC component 120 (e.g., the display to present a UI and/or a mechanical button to receive a user input and/or a haptic output component to provide a haptic output and/or the like)).

For example, LPEM-on threshold charge level 163 (e.g., for defining the initial threshold for enabling an NFC low power mode in which NFC component 120 may be enabled to carry out one or more LPEM NFC transactions) may be set by a manufacturer of device 100 to be unchanged throughout the entire period of ownership of device 100. Alternatively, LPEM-on threshold charge level 163 can be dynamic or adaptive, such that the system can set LPEM-on threshold charge level 163 to be larger or smaller (e.g., through user selection or adjustment or through use of any suitable heuristics or historical device use). In some embodiments, LPEM-on threshold charge level 163 can use a predictive engine of device 100 to determine how often the user conducts LPEM NFC transactions (e.g., NFC transactions in an LPE operating mode) and/or NFC transactions generally (e.g., NFC transactions in any device operating mode), and thereafter increase LPEM-on threshold charge level 163 if the user begins to use NFC transactions more, or decrease LPEM-on threshold charge level 163 if the user begins to use NFC transactions less. As just one example, maximum threshold charge level 161 may have a magnitude of about 4.35 Volts or may have a magnitude in a range of about 4.00 Volts to 4.70 Volts, while LPEM-on threshold charge level 163 may have a magnitude of about 3.20 Volts or may have a magnitude in a range of about 2.85 Volts to 3.55 Volts, while LPEM-off threshold charge level 165 may have a magnitude of about 2.95 Volts or may have a magnitude in a range of about 2.60 Volts to 3.30 Volts, while ODL threshold charge level 167 may have a magnitude of about 2.45 Volts or may have a magnitude in a range of about 2.10 Volts to 2.80 Volts. One, some, or each of the power management and threshold features described herein may be opted-into and/or opted-out of by a user of the device (e.g., rather than being set as an automatic or default feature), such that the user may have control over how its device's power supply may operate.

Figure 4:
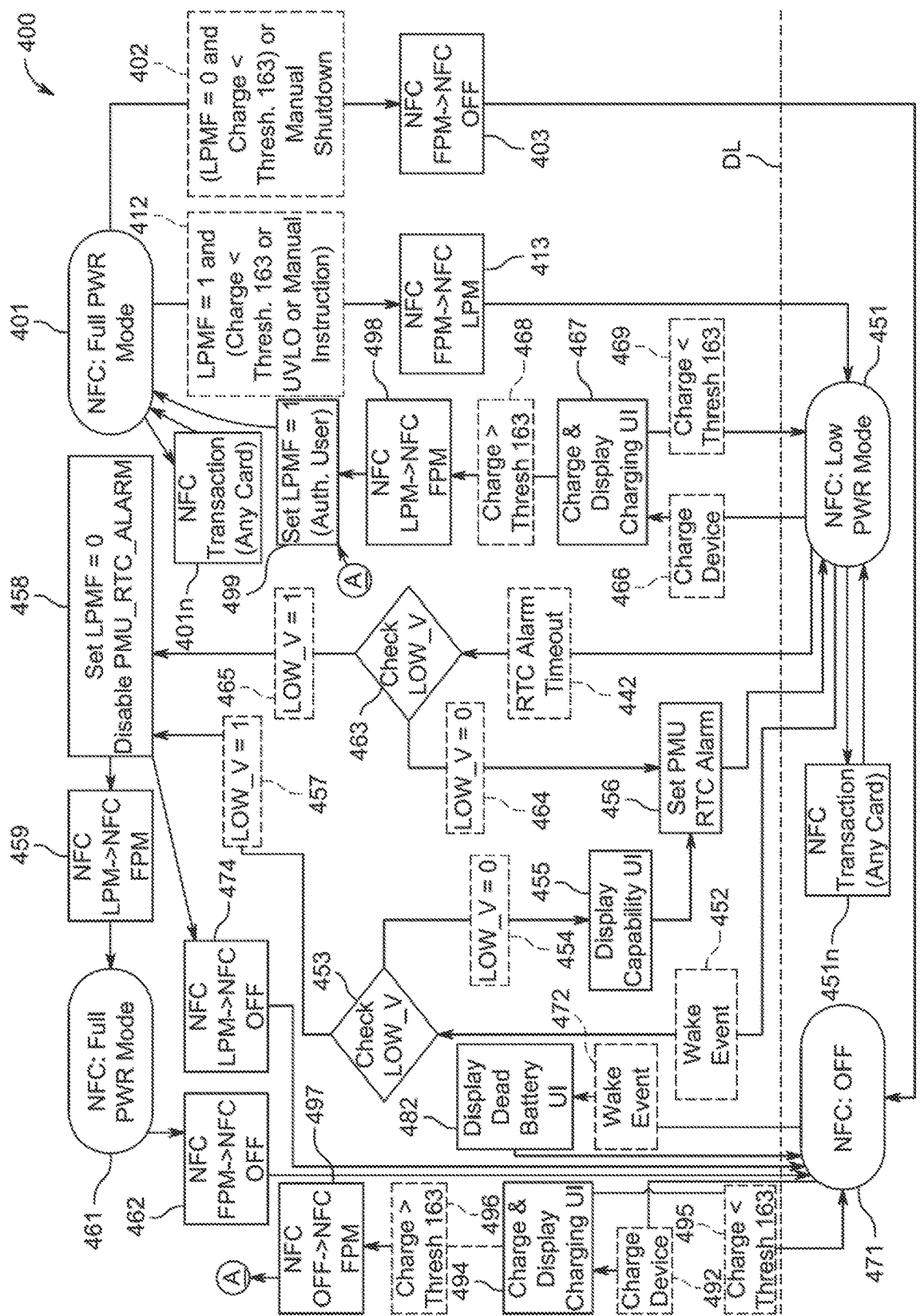
FIG. 4 is an exemplary state diagram of various power states of portions of the electronic device of FIGS. 1-3.

While various NFC transactions may be described herein as being enabled due to NFC communication component 120 being powered by power supply 108 of device 100 while device 100 is operating either in the normal operating mode of full operating charge level range 162 (e.g., when NFC communication component 120 may be in an NFC full power mode state 401 of FIG. 4) or in the LPE operating mode of LPEM operating charge level range 164 (e.g., when NFC communication component 120 may be in an NFC low power mode state 451 of FIG. 4), in some embodiments, NFC communication component 120 of device 100 can be used as a passive transaction device regardless of the level of charge of power supply 108 being provided to NFC component 120 (e.g., even when the battery charge is below LPEM-off threshold charge level 165 or even below ODL threshold charge level 167). While being used as a passive transaction device, one or more portions of device 100 (e.g., one or more portions of NFC communication component 120) can be powered by an external electromagnetic field or carrier field that may be associated with a person, business, or system with which a user of device 100 may intend to conduct contactless proximity-based communication 55. For example, a user of device 100 could be at a public subway station, bus station, or any other suitable transportation facility that may use passive transaction cards in order to provide a person with access to the respective mode of transportation. By placing device 100 near a carrier field source of terminal 10, device 100 can be provided power for the subsystem(s) of device 100 that may be configured for passive transactions and thereafter conduct a transaction, thereby allowing the user to access the transportation provided. Of course, for credential security, such passive transactions may only be enabled if an authenticated user has indicated that a particular card may be utilized in such a passive transaction.

Figure 2:
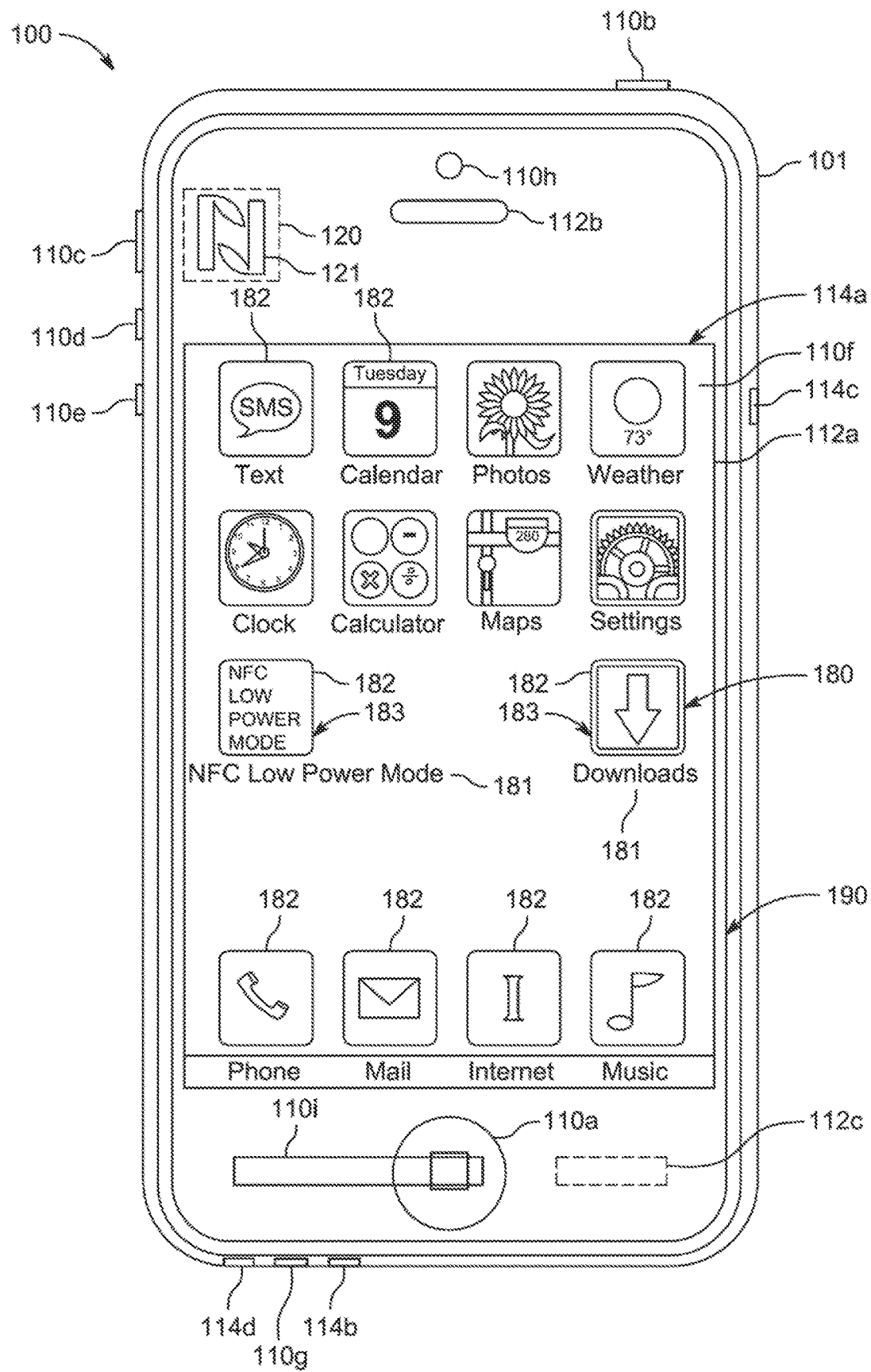
FIG. 2 is a front view of an illustrative example of the electronic device of FIG. 1.

As shown in FIG. 2, one specific example of electronic device 100 may be a handheld electronic device, such as an iPhone™, where housing 101 may allow access to various input components 110a-110i, various output components 112a-112c, and various I/O components 114a-114d through which device 100 and a user and/or an ambient environment may interface with each other. Input component 110a may include a button that, when pressed, may cause a "home" screen or menu of a currently running application to be displayed by device 100. Input component 110b may be a top or side button for toggling electronic device 100 between a sleep mode and a wake mode or between any other suitable modes. Input component 110c may include a two-position slider that may disable one or more output components 112 in certain modes of electronic device 100. Input components 110d and 110e may include buttons for increasing and decreasing the volume output or any other characteristic output of an output component 112 of electronic device 100. Each one of input components 110a-110e may be a mechanical input component, such as a button supported by a dome switch, a sliding switch, a control pad, a key, a knob, a scroll wheel, or any other suitable form.

An output component 112a may be a display that can be used to display a visual or graphic user interface ("GUI") 180, which may allow a user to interact with electronic device 100. GUI 180 may include various layers, windows, screens, templates, elements, menus, and/or other components of a currently running application (e.g., application 103 and/or application 143) that may be displayed in all or some of the areas of display output component 112a. One or more of user input components 110a-110i may be used to navigate through GUI 180 (e.g., from GUI screen 190 of FIG. 2). For example, one user input component 110 may include a scroll wheel that may allow a user to select one or more graphical elements 182 of GUI 180. Icons 182 may also be selected via a touch screen I/O component 114a that may include display output component 112a and an associated touch input component 110f. Such a touch screen I/O component 114a may employ any suitable type of touch screen input technology, such as, but not limited to, resistive, capacitive, infrared, surface acoustic wave, electromagnetic, or near field imaging. Furthermore, touch screen I/O component 114a may employ single point or multi-point (e.g., multi-touch) input sensing.

Icons 182 may represent various layers, windows, screens, templates, elements, and/or other components that may be displayed in some or all of the areas of display component 112a upon selection by the user. Furthermore, selection of a specific icon 182 may lead to a hierarchical navigation process. For example, selection of a specific icon 182 may lead to a new screen of GUI 180 that may include one or more additional icons or other GUI elements of the same application or of a new application associated with that icon 182. Textual indicators 181 may be displayed on or near each icon 182 to facilitate user interpretation of each graphical element icon 182. It is to be appreciated that GUI 180 may include various components arranged in hierarchical and/or non-hierarchical structures. When a specific icon 182 is selected, device 100 may be configured to open a new application associated with that icon 182 and display a corresponding screen of GUI 180 associated with that application. For example, when the specific icon 182 labeled with an NFC LOW POWER MODE textual indicator 181 (i.e., specific icon 183) is selected, device 100 may launch or otherwise access a specific NFC low power mode or wallet mode application (e.g., application 143) and may display screens of a specific user interface that may include one or more tools or features for interacting with NFC component 120 in a specific manner (e.g., one or more user interfaces for enabling an authenticated user to select one or more credentials that may later be utilized to carry out an LPEM NFC transaction when NFC component 120 is operating in an NFC low power mode (e.g., for enabling a user to select or provision a credential on device 100 as an "express mode card") (e.g., as described with respect to state diagram 500 of FIG. 5) and/or for enabling an authenticated user to define one or more particular rules for the use of such a credential (e.g., for enabling a user to determine one or more ways in which an identified "express mode card" may be used in an LPEM NFC transaction (e.g., define a maximum number of times that an express mode card may be used during a particular NFC low power mode and/or define a maximum duration of time after a most recent user authentication event that an express mode card may be used in an LPEM NFC transaction))). For each application, screens may be displayed on display output component 112a and may include various user interface elements. Additionally or alternatively, for each application, various other types of non-visual information may be provided to a user via various other output components 112 of device 100. For example, device 100 may be configured to let a user select one or more credentials of a first type but not a second type to be available as an express mode card, where the first type (e.g., simple transit system credentials, such as for the subway, etc.) may be a type of credential that may not warrant as a high a level of security as the second type (e.g., credit card credentials, high security access credentials, etc.).

Electronic device 100 also may include various other I/O components 114 that may allow for communication between device 100 and other devices. I/O component 114b may be a connection port that may be configured for transmitting and receiving data files, such as media files or customer order files, from a remote data source and/or power from an external power source. For example, I/O component 114b may be a proprietary port, such as a Lightning™ connector or a 30-pin dock connector from Apple Inc. of Cupertino, California. I/O component 114c may be a connection slot for receiving a SIM card or any other type of removable component. I/O component 114d may be a headphone jack for connecting audio headphones that may or may not include a microphone component. Electronic device 100 may also include at least one audio input component 110g, such as a microphone, and at least one audio output component 112b, such as an audio speaker.

Electronic device 100 may also include at least one tactile or haptic output component 112c (e.g., a rumbler or any other suitable subsystem operative to provide haptic or tactile feedback to a user), a camera and/or scanner input component 110h (e.g., a video or still camera, and/or a bar code scanner or any other suitable scanner that may obtain product identifying information from a code, such as a bar code, a QR code, or the like), and a biometric input component 110i (e.g., a fingerprint reader or other feature recognition sensor, which may operate in conjunction with a feature-processing application that may be accessible to electronic device 100 for authenticating a user). As shown in FIG. 2, at least a portion of biometric input component 110i may be incorporated under or otherwise combined with input component 110a or any other suitable I/O component of device 100. For example, biometric input component 110i may be a fingerprint reader that may be configured to scan the fingerprint of a user's finger as the user interacts with mechanical input component 110a by pressing input component 110a with that finger. As another example, biometric input component 110i may be a fingerprint reader that may be combined with touch input component 110f of touch screen I/O component 114a, such that biometric input component 110i may be configured to scan the fingerprint of a user's finger as the user interacts with touch screen input component 110f by pressing or sliding along touch screen input component 110f with that finger. Moreover, as mentioned, electronic device 100 may further include NFC component 120, which may be communicatively accessible to terminal 10 via antenna 116 and/or antenna 134 (not shown in FIG. 2). NFC component 120 may be located at least partially within housing 101, and a mark or symbol 121 can be provided on the exterior of housing 101 that may identify the general location of one or more of the antennas associated with NFC component 120 (e.g., the general location of antenna 116 and/or antenna 134).

Figure 3:
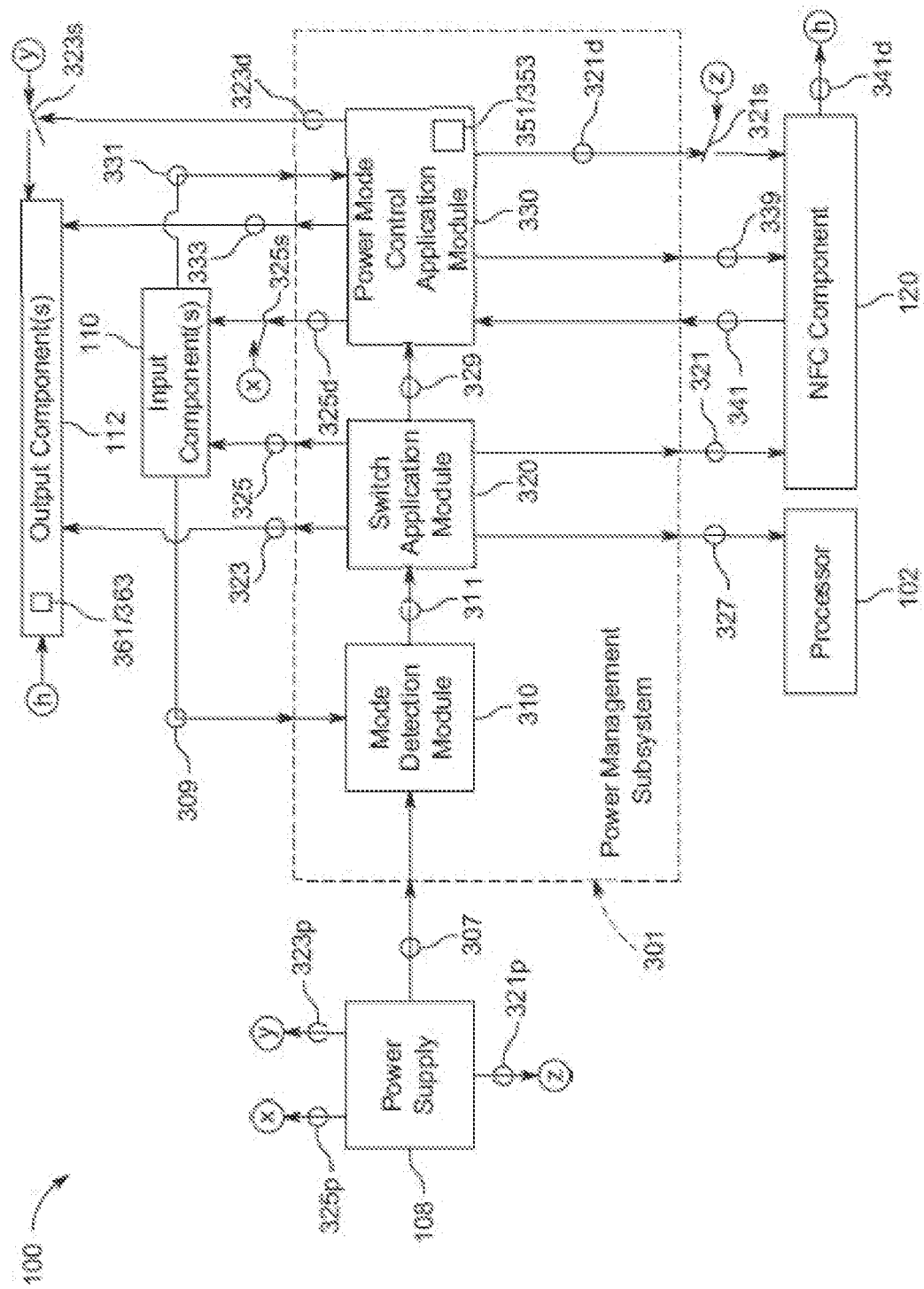
FIG. 3 is a schematic view of an illustrative portion of the electronic device of FIGS. 1-2B.
Figure 5:
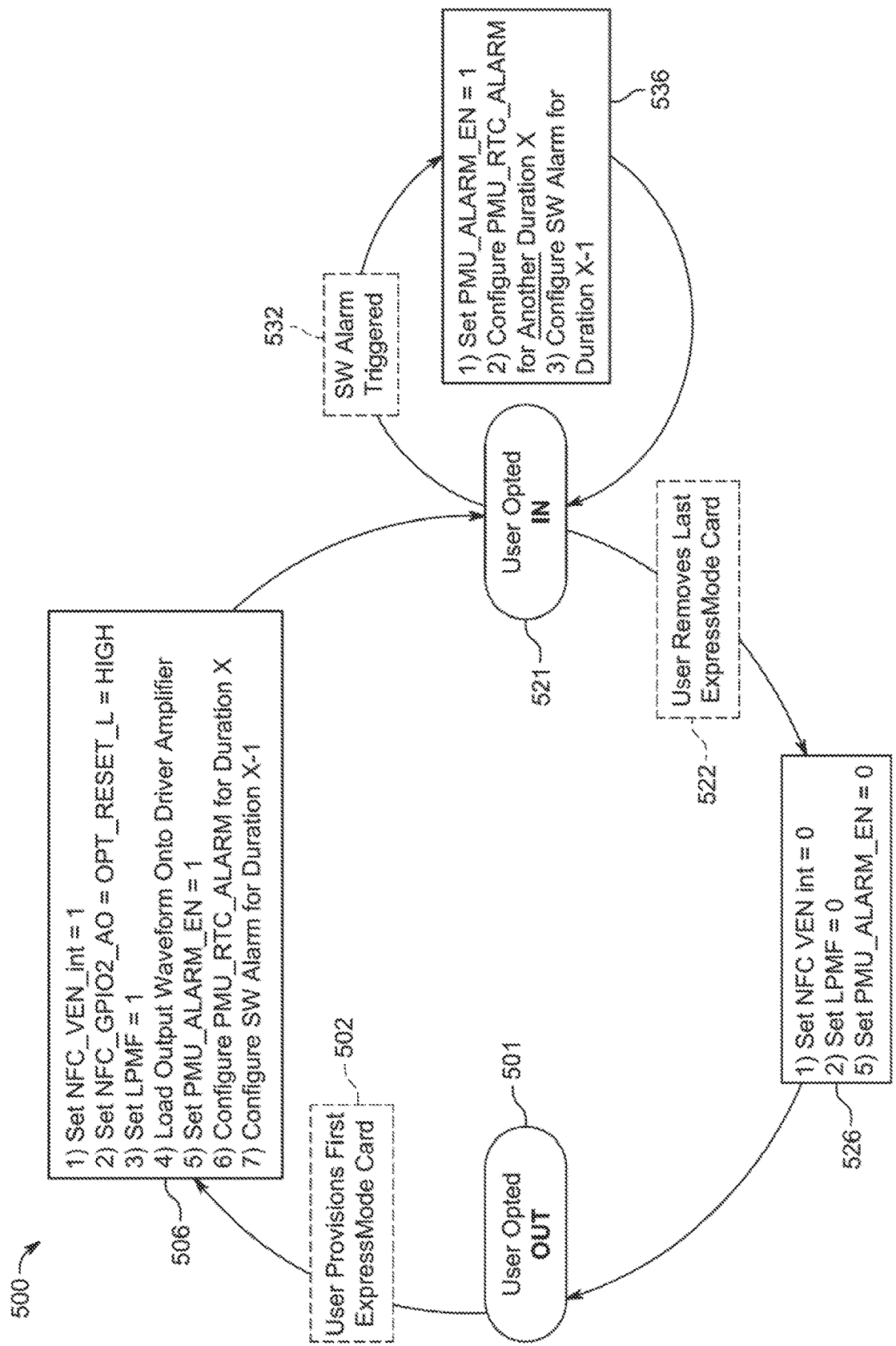
FIG. 5 is an exemplary state diagram of various configurations of portions of the electronic device of FIGS. 1-3.

To facilitate the following discussion regarding the operation of electronic device 100 in managing near field communications (e.g., communications 55 with terminal 10) during an NFC low power express mode of operation, reference is made to a schematic diagram of a power management subsystem 301 of electronic device 100 (e.g., as shown in FIG. 3), an exemplary state diagram of various power states of portions of electronic device 100 (e.g., as shown in FIG. 4), an exemplary state diagram of various configurations of portions of electronic device 100 (e.g., as shown in FIG. 5), and front views of screens 200a and 200b that may be representative of a graphical user interface of electronic device 100 during such near field communication management (e.g., as shown in FIGS. 2A and 2B). The operation described may be achieved with a wide variety of graphical elements and visual schemes. Therefore, the embodiments of FIGS. 2A and 2B are not intended to be limited to the precise user interface conventions adopted herein. Rather, embodiments may include a wide variety of user interface styles.

FIG. 3 shows a schematic view of near field communication management subsystem 301 of electronic device 100 that may be provided to manage near field communications during different operating modes of electronic device 100. For example, power management subsystem 301 may determine when to utilize an NFC low power express mode of electronic device 100 and/or how to manage NFC component 120 during such a low power express mode (e.g., how to make credentials of NFC component 120 appropriately secure and/or appropriately accessible during such a low power express mode).

Electronic device 100 can be configured to operate according to different power management modes for controlling and managing power consumption by the various components of device 100. As shown in FIG. 3, for example, power management subsystem 301 may include a mode detection module 310 that may be configured to determine when to enter a particular one of various power management modes of electronic device 100. For example, mode detection module 310 may be configured to determine when to enter a particular one of many possible power management modes, such as a full or normal operating mode, a high battery trap or LPE operating mode, a low battery trap operating mode, or a power disconnect operating mode of electronic device 100 (e.g., as described with respect to battery chart 108a of FIG. 1A). In particular, mode detection module 310 can be configured to switch the operation of electronic device 100 amongst the various particular power management modes for reducing power consumption when device 100 is not connected to a remote power supply (e.g., when power supply 108 is not plugged into a wall socket). For example, operation of device 100 in a particular power management mode can prevent non-essential power intensive processes from being performed by device 100 while device 100 is being powered by a battery that has less than a certain threshold of power potential remaining.

As shown in FIG. 3, mode detection module 310 may be configured to poll for or otherwise receive power level data 307 from power supply 108, where power level data 307 may be indicative of the amount of power remaining in power supply 108 (e.g., when power supply 108 may be a battery whose power level may diminish during use). When mode detection module 310 detects that the remaining power of power supply 108 indicated by received power level data 307 has dropped below a particular threshold (e.g., below one of threshold charge levels 163, 165, or 167, or any other suitable threshold), mode detection module 310 may be configured to generate a switch command 311 that may be configured to switch electronic device 100 to a particular power management operating mode based on the particular new operating charge level range entered by power supply 108 (e.g., to a full or normal operating mode when the charge level has entered range 162, to a high battery trap or LPE operating mode when the charge level has entered range 164, to a low battery trap operating mode when the charge level has entered range 166, or to a power disconnect operating mode when the charge level has entered range 162 (e.g., as described with respect to battery chart 108a of FIG. 1A)). For example, as shown in FIG. 3, when mode detection module 310 detects that received power level data 307 is indicative of a particular characteristic of power supply 108 (e.g., that power supply 108 has dropped below a particular power threshold), mode detection module 310 may be configured to generate switch command 311 and provide switch command 311 to a switch application module 320 of power management subsystem 301.

As another example of an initiation event of a particular operating mode (e.g., an NFC low power express mode) that may be detectable by mode detection module 310, mode detection module 310 may be configured to receive input mode selection data 309 from an input component 110 (e.g., one or more of input components 110a-110i). Such input mode selection data 309 may be any suitable data generated by input component 110 that may be indicative of a desire to enter a particular mode. For example, input mode selection data 309 may be indicative of a user selecting "NFC LOW POWER MODE" icon 183 of GUI 180 using touch screen input component 110f of I/O component 114a of FIG. 2, and this may be recognized by mode detection module 310 as an initiation event for entering an NFC low power express mode. Thus, when mode detection module 310 receives such specific input mode selection data 309, mode detection module 310 may be configured to generate switch command 311 and provide switch command 311 to switch application module 320 of power management subsystem 301. Therefore, in addition to or as an alternative to device 100 switching to an NFC low power express mode when power supply 108 is below a certain power threshold (e.g., within LPEM operating charge level range 164 between LPEM-on threshold charge level 163 and LPEM-off threshold charge level 165), such an NFC low power express power management mode may be entered at a user's discretion or during any other suitable situation.

Regardless of why mode detection module 310 may generate switch command 311 and transmit switch command 311 to switch application module 320 (e.g., in response to a particular received power level data 307 and/or in response to a particular received input mode selection data 309), switch application module 320 may be configured to switch electronic device 100 into a particular power management operating mode (e.g., into an NFC low power express mode) in response to receipt of such a switch command 311. This switch process into a new power management operating mode can include switch application module 320 generating and transmitting one or more disabling commands to one or more components of device 100 for at least partially shutting down, removing power from, or otherwise at least partially disabling at least one function of such components (e.g., if switching to a lower power mode or if a particular component is otherwise to be at least partially disabled for the new operating mode), which may reduce the power consumption of one or more components of device 100 and/or may at least partially disable one, some, or all components of device 100 that are not necessary for at least initially operating device 100 in the new power management operating mode (e.g., one or more NFC communication component switching commands 321 for shutting down, removing power from, or otherwise at least partially disabling at least one function of NFC communication component 120, one or more output component switching commands 323 for shutting down, removing power from, or otherwise at least partially disabling at least one function of at least one input component 110, one or more input component switching commands 325 for shutting down, removing power from, or otherwise at least partially disabling at least one function of at least one output component 112, and/or one or more processor component switching commands 327 for shutting down, removing power from, or otherwise at least partially disabling at least one function of at least one processor component 102). Alternatively or additionally, this switch process into a new power management operating mode can include switch application module 320 generating and transmitting one or more enabling commands to one or more components of device 100 for at least partially turning on, providing power to, or otherwise at least partially enabling at least one function of such components (e.g., if switching to a higher power mode or if a particular component is otherwise to be at least partially enabled for the new operating mode), which may increase the power consumption of one or more components of device 100 and/or may at least partially enable one, some, or all components of device 100 that are may be necessary or at least utilized for at least initially operating device 100 in the new power management operating mode (e.g., one or more NFC communication component switching commands 321 for turning on, providing power to, or otherwise at least partially enabling at least one function of NFC communication component 120, one or more output component switching commands 323 for turning on, providing power to, or otherwise at least partially enabling at least one function of at least one input component 110, one or more input component switching commands 325 for turning on, providing power to, or otherwise at least partially enabling at least one function of at least one output component 112, and/or one or more processor component switching commands 327 for turning on, providing power to, or otherwise at least partially enabling at least one function of at least one processor component 102).

For example, in response to receipt of a switch command 311 operative to switch device 100 from a normal operating mode to an NFC low power express mode (e.g., in response to the charge level of power supply 108 entering into LPEM operating charge level range 164 or in response to a user input manually requesting a switch into such an NFC low power express mode (e.g., to conserve power of power supply 108)), switch application module 320 generate and transmit an NFC disabling command 321 to NFC component 120 as part of the switching process to the NFC low power express mode. Such an NFC disabling command 321 may be configured to be received by any suitable element of NFC component 120 such that at least one credential previously enabled by NFC component 120 prior to receipt of command 321 may be disabled in response to receipt of command 321. As one particular example, command 321 may disable NFC antenna 134 and/or booster 136 of NFC device module 130 when command 321 is received by NFC component 120, such that no NFC communications 55 may be transmitted by NFC component 120 to terminal 10 after such disablement (e.g., if a user has not selected any credentials provisioned on device 100 for use during such a mode). As another example, command 321 may disable a first applet 153 of a first SSD 154 of NFC memory module 150 when command 321 is received by NFC component 120, such that no NFC communications 55 associated with the credentials of that first applet 153 may be transmitted by NFC component 120 to terminal 10 after such disablement. In some embodiments, command 321 may disable every applet 153 of every SSD 154 of NFC memory module 150 when command 321 is received by NFC component 120, such that no NFC communications 55 associated with any credential of any applet 153 of any SSD 154 may be transmitted by NFC component 120 to terminal 10 after such disablement. However, in other embodiments, command 321 may disable only some specific applets 153 of some SSDs 154 of NFC memory module 150 when command 321 is received by NFC component 120, such that NFC communications 55 associated with the credentials of those specific applets (e.g., credit card credentials, which may warrant a high security level) may not be transmitted by NFC component 120 to terminal 10 after such disablement, but such that other NFC communications 55 that are associated with the credentials of other specific applets (e.g., simple transit system credentials, such as for the subway, which may not warrant a high security level) may be transmitted by NFC component 120 to terminal 10 after such disablement (e.g., based on default credential settings and/or based on specific user selected settings for particular individual or particular groups or types credentials provisioned on device 100). When received by NFC component 120, NFC disabling command 321 may be configured to shut down, remove power from, or otherwise at least partially disable at least one function of NFC component 120. In some embodiments, NFC component 120 may be provided with no NFC disabling command 321 but instead NFC component 120 may be operated the same as it was in a full power mode (e.g., NFC component 120 may be powered the same by power supply 108 no matter whether device 100 is in a normal operating mode or an NFC LPEM mode. In some embodiments, power management subsystem 301 may be configured to switch electronic device 100 from a normal operating mode to an NFC low power express mode by providing an NFC disabling command 321 that may prevent NFC command 120 from receiving any power from power supply 108 via power management subsystem 301 and/or by providing an NFC direct power command 321*d* that may be operative to close a switch 321*s* for enabling any suitable power 321*p* to be directly provided from power supply 108 to NFC component 120 for powering NFC component 120 during an NFC LPEM mode of operation. In such embodiments, power management subsystem 301 may also be configured to switch electronic device 100 from an NFC low power express mode to an NFC off mode (e.g., when switching to a low battery trap operating mode or to a power disconnect operating mode) by providing another NFC direct power command 321*d* that may be operative to open switch 321*s* for preventing any power 321*p* from being directly provided from power supply 108 to NFC component 120.

In addition to or as an alternative to generating an NFC disabling command 321, switch application module 320 may be configured to switch electronic device 100 from a normal operating mode to an NFC low power express mode (e.g., in response to the charge level of power supply 108 entering into LPEM operating charge level range 164 or in response to a user input requesting a manual switch into such an NFC low power express mode (e.g., to conserve power of power supply 108)) by generating and transmitting an output component disabling command 323 to at least one output component 112 (e.g., at least one of output components 112*a*-112*c*). When received by that output component 112, such an output component disabling command 323 may be configured to shut down, remove power from, or otherwise at least partially disable at least one function of that output component 112. For example, in response to display output component 112*a* receiving such a disabling command 323, display output component 112*a* may be turned off (e.g., no more power may be provided to display output component 112*a*). In some embodiments, power management subsystem 301 may be configured to switch electronic device 100 from a normal operating mode to an NFC low power express mode by providing an output component disabling command 323 to at least one or all output components 112 for preventing such output component(s) from receiving any power from power supply 108 via power management subsystem 301 and by also providing an output direct power command 323d that may be operative to close a switch 323s for enabling any suitable power 323p to be directly provided from power supply 108 to a particular output component 112 (e.g., haptic output component 112c) for powering that particular output component 112 during an NFC LPEM mode of operation. In such embodiments, power management subsystem 301 may also be configured to switch electronic device 100 from an NFC low power express mode to an NFC off mode (e.g., when switching to a low battery trap operating mode or to a power disconnect operating mode) by providing another output direct power command 323d that may be operative to open switch 323s for preventing any power 323p from being directly provided from power supply 108 to that particular output component 112 that had been previously directly powered (e.g., haptic output component 112c).

Similarly, switch application module 320 may be configured to switch electronic device 100 from a normal operating mode to an NFC low power express mode (e.g., in response to the charge level of power supply 108 entering into LPEM operating charge level range 164 or in response to a user input requesting a switch into such an NFC low power express mode (e.g., to conserve power of power supply 108)) by generating and transmitting an input component disabling command 325 to at least one input component 110 (e.g., one or more of input components 110a-110i). When received by that input component 110, input component disabling command 325 may be configured to shut down, remove power from, or otherwise at least partially disable at least one function of that input component 110. In some embodiments, power management subsystem 301 may be configured to switch electronic device 100 from a normal operating mode to an NFC low power express mode by providing an input component disabling command 325 to at least one or all input components 110 for preventing such input component(s) from receiving any power from power supply 108 via power management subsystem 301 and by also providing an input direct power command 325d that may be operative to close a switch 325s for enabling any suitable power 325p to be directly provided from power supply 108 to a particular input component 110 (e.g., side button input component 110b) for powering that particular input component 110 during an NFC LPEM mode of operation. In such embodiments, power management subsystem 301 may also be configured to switch electronic device 100 from an NFC low power express mode to an NFC off mode (e.g., when switching to a low battery trap operating mode or to a power disconnect operating mode) by providing another input direct power command 325d that may be operative to open switch 325s for preventing any power 325p from being directly provided from power supply 108 to that particular input component 110 that had been previously directly powered (e.g., side button input component 110b).

Similarly, switch application module 320 may be configured to switch device 100 from a normal operating mode to an NFC low power express mode or NFC LPE power management mode (e.g., in response to the charge level of power supply 108 entering into LPEM operating charge level range 164 or in response to a user input requesting a switch into such an NFC low power express mode (e.g., to conserve power of power supply 108)) by generating and transmitting an application disabling command 327 to processor 102. When received by processor 102, application disabling command 327 may be configured to shut down or otherwise at least partially disable one or more applications currently being run by processor 102 (e.g., to force quit all non-native applications and/or any non-essential applications and/or all applications that were running on device 100 prior to the generation of that application disabling command 327). This may reduce the power consumption of processor 102 going forward with the switch to the NFC low power express mode.

Moreover, additionally or alternatively, switch application module 320 may be configured to switch device 100 from a normal operating mode to an NFC low power express mode (e.g., in response to the charge level of power supply 108 entering into LPEM operating charge level range 164 or in response to a user input requesting a switch into such an NFC low power express mode (e.g., to conserve power of power supply 108)) by generating and transmitting one or more additional disabling commands (not shown) to at least one other component of device 100 (e.g., memory 104, communication component 106, antenna 116, etc.), such that, when received by that device component, that component disabling command may be configured to shut down, remove power from, or otherwise at least partially disable at least one function of that device component.

Therefore, switch application module 320 may be configured to initiate the transition of electronic device 100 into a new power management mode by generating and transmitting one or more disabling commands and/or one or more enabling commands (e.g., commands 321, 323, 325, 327, etc.) that may be configured to shut down, remove power from, or otherwise at least partially disable one, some, or all components of device 100 that are not necessary for at least initially operating device 100 in the new power management mode and/or that may be configured to turn on, provide power to, or otherwise at least partially enable one, some, or all components of device 100 that may be utilized for at least initially operating device 100 in the new power management mode. For example, as mentioned, one or more disabling commands of switch application module 320 may be configured to at least partially turn off one or more input components 110, one or more output components 112, processor 102 or at least one or more applications being run by processor 102, at least some of memory 104, at least some or all of communications component 106, antenna 116, and/or some or all of NFC component 120. When at least initially operating in such an NFC low power express mode, electronic device 100 may be configured to refrain from providing power to or otherwise enabling particular device components that are not necessary for securely managing NFC component 120. For example, in response to receiving one or more disabling commands from switch application module 320, electronic device 100 can turn off a hard drive (e.g., memory 104), dim or turn off a display (e.g., output component 112a), place a processor (e.g., processor 102) in a low-power "sleep" or "hibernate" or "off" mode, and/or completely or partially disable NFC component 120. Some or all of the power management settings of power management subsystem 301 can be set automatically or by a user of device 100 (e.g., the user may define a duration and/or a condition before device 100 switches between particular power management modes and/or the components that may be at least partially disabled or turned off when switching between different power management modes, such as the NFC low power express mode). By forcing electronic device 100 to operate in such an NFC low power express mode, switch application module 320 may eventually allow electronic device 100 to securely utilize NFC component 120 for communications 55 in an efficient manner (e.g., until power supply 108 is no longer able to power electronic device 100 to operate in that mode (e.g., until a level of power supply 108 falls below threshold charge level 165)).

Therefore, at least certain modules of power management subsystem 301 may be configured as a power management unit ("PMU") that may be coupled to at least one source of power, such as power supply 108. Such a PMU may include a microcontroller and can be configured to govern the power functions of device 100. Such a PMU may include its own memory (e.g., loaded with software and/or firmware), processor with input/output functionality and timers, as well as one or more converters for measuring the power provided by power supply 108. Moreover, additionally or alternatively, such a PMU may include a backup power source that can power components of power management subsystem 301 even when device 100 is completely shut down, such that, for example, the current time of a real-time clock ("RTC") may be maintained. For example, an RTC 351 may be provided by subsystem 301 (e.g., by a power mode control application module 330 or otherwise), where RTC 351 may be provided as an integrated circuit (e.g., an integrated circuit with one or more general-purpose input/outputs ("GPIOs")) and/or may include one or more registers 353 (e.g., one or more RTC counter registers and/or one or more PMU scratch pad registers). Such a PMU may be responsible for coordinating certain functions of device 100, including, but not limited to, monitoring power connections and battery charges, controlling power provided to other components of device 100, shutting down certain components of device 100 when they are left idle or deemed to be currently unnecessary to properly operate device 100, regulating a real-time clock of device 100, and controlling various power management modes of device 100. A battery control circuit or power management stage may be connected to a battery and to the base-band/firmware processor. One or more dedicated connections from such a PMU and/or from power supply 108 to various elements of NFC component 120 (e.g., device module 130, controller module 140, and/or memory module 150) may also be provided by power management subsystem 301. These additional connections may be provided to enable a battery control circuit or power supply circuit to selectively power various components of device 100, and especially the various components necessary to perform NFC communication with terminal 10.

When switch application module 320 has received switch command 311 from mode detection module 310 and has thereafter generated and transmitted one or more commands (e.g., commands 321, 323, 325, etc.) for at least partially adjusting one, some, or all components of device 100 for at least initially operating device 100 in the new power management mode, switch application module 320 may also be configured to generate and transmit a launching command 329 to a power mode control application module 330 of power management subsystem 301. In response to receiving launching command 329, control application module 330 may be configured to launch and run at least one application (e.g., application 143) that may be specifically tailored to appropriately manage and/or otherwise control electronic device 100 in the new power management mode. Therefore, for example, operation of device 100 in an NFC LPE mode may be based on one or more applications accessible to electronic device 100 (e.g., application 143) and/or based on any input instructions being received by electronic device 100 (e.g., via input component 110) that may control such an application.

As an example, when control application module 330 receives launching command 329 for managing device 100 in an NFC LPE power management mode, NFC component 120 may be initially configured by NFC command 321 and/or NFC direct power command 321d to be in an active antenna mode (e.g., where antenna 116 and/or antenna 134 may be actively enabled for NFC communication by electronic device 100 itself (e.g., by power supply 108)). It is to be understood that when NFC component 120 is initially configured by NFC command 321 and/or NFC direct power command 321d to be in either the passive or active antenna modes, one or more other elements of NFC component 120 (e.g., an applet 153 of one or more SSDs 154) may be initially disabled by NFC disabling command 321 and/or NFC direct power command 321d to prevent a passive/active antenna from communicating a credential of NFC component 120 as communication 55 to terminal 10 (e.g., certain applets associated with certain credentials may have a particular register or flag set or not set (e.g., due to user preference) that may prevent those credentials from being used in a transaction with terminal 10 during an NFC LPE power management mode, while other certain applets associated with other certain credentials may have a particular register or flag set or not set (e.g., due to user preference) that may allow those credentials to be used in a transaction with terminal 10 during an NFC LPE power management mode). For example, one or more flags or registers in NFC component 120 (e.g., a flag or register in a particular SSD or applet associated with a particular credential) may be set (e.g., while device 100 is operating in a full or normal operating mode) to enable or not enable one or more particular credentials from being used while in an NFC LPE power management mode. Additionally or alternatively, an LPM flag ("LPMF") may be set (e.g., to either '1' or '0'), for example, in a PMU scratch pad register (e.g., register 353 (e.g., in non-volatile memory)) in a particular manner based on whether or not any credential has been enabled (e.g., by a user) for use when an NFC LPE mode is entered. For example, as shown in FIG. 5, an exemplary state machine 500 may be provided for illustrating various configurations of portions of electronic device 100 for determining whether an NFC LPE mode may be utilized by device 100. Each state of state machine 500 may be possible while NFC component 120 is in an NFC full power mode of an NFC full power mode state 401 of state diagram 400 of FIG. 4. For example, at state 501 of state machine 500, electronic device 100 may be in a state in which there is no credential provisioned on device 100 (e.g., in NFC component 120) that has been selected (e.g., by a user or otherwise) for potential use in a communication 55 with terminal 10 during a future NFC low power express mode of operation of device 100. In response to any suitable event 502 in which a first credential may be selected for potential use in a future NFC low power express mode (e.g., when a user selects or provisions a credential on device 100 as an "express mode card" or "express mode credential" (e.g., while device 100 is operating in a full or normal operating mode)), device 100 may be configured to transition from state 501 to a state 521 in which there is at least one credential provisioned on device 100 (e.g., in NFC component 120) that has been selected (e.g., by a user or otherwise) for potential use in a communication 55 with terminal 10 during a future NFC low power express mode of operation of device 100. During such a transition between state 501 and state 521, device 100 may be configured to take one or more actions 506 (e.g., automatically) in order for device 100 to properly perform in accordance with that new state 521. For example, as shown, action(s) 506 may include any suitable action or combination of actions, including, but not limited to, one or more of the following actions:

(1) setting NFC_VEN_int=1;
(2) setting NFC_GPIO2_AO=OPT_RESET_L=HIGH;
(3) setting LPMF=1;
(4) loading an output waveform onto a driver amplifier;
(5) setting PMU_ALARM_EN=1;
(6) configuring PMU_RTC_ALARM for a duration X; and/or
(7) configuring a SW_Alarm for a duration X−1 (e.g., any suitable duration less (e.g., slightly less than duration X).

Similarly, in response to any suitable event 522 in which a last credential may be de-selected for potential use in a future NFC low power express mode (e.g., when a user adjusts the only credential on device 100 previously identified as an express mode card to a credential that is not to be identified as an express mode card or removes such a card altogether (e.g., while device 100 is operating in a full or normal operating mode)), device 100 may be configured to transition from state 521 to state 501 in which there is no credential provisioned on device 100 (e.g., in NFC component 120) that has been selected (e.g., by a user or otherwise) for potential use in a communication 55 with terminal 10 during a future NFC low power express mode of operation of device 100. During such a transition between state 521 and state 501, device 100 may be configured to take one or more actions 526 (e.g., automatically) in order for device 100 to properly perform in accordance with that new state 501. For example, as shown, action(s) 526 may include any suitable action or combination of actions, including, but not limited to, one or more of the following actions:

(1) setting NFC_VEN_int=0;
(2) setting LPMF=0; and/or
(3) setting PMU_ALARM_EN=0.

Additionally or alternatively, in response to any suitable event 532 in which a SW_Alarm may elapse (e.g., be triggered) while device 100 is in state 521, device 100 may be configured to take one or more actions 536 (e.g., automatically) in order for device 100 to properly respond to event 532. For example, as shown, action(s) 536 may include any suitable action or combination of actions, including, but not limited to, one or more of the following actions:

(1) setting PMU_ALARM_EN=1;
(2) configuring PMU_RTC_ALARM for another duration X; and/or
(3) configuring a SW_Alarm for duration X−1.

Each one of actions 506, 526, and 536 may be described in more detail with respect to FIG. 4 and operation of NFC component 120 in a low power express mode of electronic device 100. It is understood that the various operations and conditions shown in state diagram 500 of FIG. 5 are only illustrative and that existing operations and conditions may be modified or omitted, additional operations and conditions may be added, and the order of certain operations and conditions may be altered.

Control application module 330 may be configured to receive any suitable input component command 331 from any suitable input component 110 (e.g., side button input component 110b) that may be at least partially or at least temporarily enabled during the current power management mode (e.g., by power 325p during a low power express mode). Additionally or alternatively, control application module 330 may be configured to provide any suitable output component command 333 to any suitable output component 112 that may be at least partially or at least temporarily enabled during the current power management mode (e.g., haptic output component 112c by power 323p during a low power express mode) or for waking up any suitable output component 112 that may be normally disabled during the current power management mode (e.g., display output component 112a during a battery trap operating mode (e.g., a low power express mode)). Additionally or alternatively, control application module 330 may be configured to provide any suitable NFC component input command 339 to any suitable portion of NFC component 120 that may be at least partially or at least temporarily enabled during the current power management mode (e.g., by power 321p during a low power express mode). Additionally or alternatively, control application module 330 may be configured to receive any suitable NFC component output command 341 from any suitable portion of NFC component 120 that may be at least partially or at least temporarily enabled during the current power management mode (e.g., by power 321p during a low power express mode). Control application module 330 may be configured to generate any suitable one or more of commands 333 and/or 339 (and/or one or more of commands 321d, 323d, and/or 325d) during the current power management mode, and/or to receive any suitable one or more of commands 331 and/or 341 during the current power management mode, for example, in accordance with any suitable power management mode application or rule set or state machine that may be specifically tailored to appropriately manage and/or otherwise control electronic device 100 in the current power management mode (e.g., state machine 400 of FIG. 4).

For example, as shown in FIG. 4, an exemplary state machine 400 may be provided for illustrating at least one particular manner in which power management subsystem 301 may operate for managing near field communications during a low power express mode of electronic device 100. As shown, at an NFC full power mode ("NFC FPM") state 401, NFC component 120 may be powered on and may be functioning normally. For example, at state 401, electronic device 100 may be operating in the full or normal operating mode (e.g., when a charge level of power supply 108 is within full operating charge level range 162 between threshold charge levels 161 and 163), in which NFC component 120 and any other suitable components of device 100 (e.g., a display output component 112, a touch screen input component 110, an application processor 102 running any suitable operating system application and/or any suitable specific UI applications, a cellular communications component 106, etc.) may be provided with power by power supply 108 (e.g., via power management system 301 (e.g., via a PMU)) and may be functioning normally. For example, as shown, while operating in an NFC full power mode of NFC FPM state 401, NFC component 120 may be configured to carry out any suitable transactions or communications 55 between electronic device 100 and terminal 10 at operation 401n using any credential of device 100 (e.g., whether or not the credential is currently designated as an express mode card). However, in response to detecting any suitable first condition 402, the state of electronic device 100 may transition from state 401 to an NFC off power mode ("NFC OFF") state 471, at which NFC component 120 may be powered off (e.g., for conserving power), or, in response to detecting any suitable second condition 412, the state of electronic device 100 may transition from state 401 to an NFC low power mode ("NFC LPM") state 451, at which NFC component 120 may remain powered but limited to enabling transactions for only credentials designated as an express mode card (e.g., for conserving power). For example, as shown, while operating in an NFC low power mode of NFC LPM state 451, NFC component 120 may be configured to actively carry out any suitable transactions or communications 55 between electronic device 100 and terminal 10 at operation 451*n* using any credential of device 100 that is currently designated as an express mode card. However, while operating in an NFC off power mode of NFC OFF state 471, NFC component 120 may not be configured to actively carry out any suitable transactions or communications 55 between electronic device 100 and terminal 10 (e.g., due to NFC component 120 being not provided with any power in that state (although it is to be noted that certain passive transactions may be able to occur at NFC OFF state 471 if certain security measures are taken)).

For example, at state 471, in which NFC component 120 may be powered off, electronic device 100 may be operating in any suitable operating mode, such as in a completely powered off mode (e.g., when device 100 has automatically shut down due to a charge level of power supply 108 falling within disconnect operating charge range 168 below threshold charge level 167 or when device 100 has any other suitable charge level but has been manually shut down by a user (e.g., a possible condition 402)) or in a battery trap operating mode (e.g., when a charge level of power supply 108 has fallen below threshold charge level 163 and into one of ranges 164 or 166 (e.g., a possible condition 402)). At state 471, a system PMU of device 100 may be powered off or inactive, power may not be provided to NFC component 120 (e.g., via power management system 301 or directly through switch 321*s*), and only limited functionality, if any, may be enabled for other portions of electronic device, such as a functionality for enabling a user to determine if device 100 is operating in the battery trap mode. For example, if device 100 is operating in the battery trap mode while at state 471, a limited functionality may be enabled by device 100 for enabling the sensing of a particular user interaction with a particular input component (e.g., a user press of side button input component 110*b* (e.g., detection of any suitable wake event condition 472), where side button input component 110*b* may be at least partially or at least temporarily enabled during the current power management mode (e.g., by power 325*p* during the battery trap mode)) and then temporarily powering on display output component 112*a* (e.g., by booting up a system PMU, then booting up at least another portion or the rest of the system (e.g., a boot loader and potentially an operating system application)) for displaying a very specific UI screen (e.g., a "dead battery UI" screen 190*b* of FIG. 2B (e.g., at an operation 482)) in response to sensing such a particular user input component interaction, such that a user may be able to determine that device 100 is operating in the battery trap mode (e.g., to provide a user some peace of mind that device 100 is not in a power disconnect operating mode (e.g., of range 168)). For example, while device 100 is operating in a battery trap mode (e.g., when the charge level 307 of power supply 108 is within one of ranges 164 and 166) while NFC component is in an NFC off power mode at state 471, in response to detection of a button press condition 472 by input component 110*b* that may be powered directly by power 325*p*, input component 110*b* may be configured to generate and transmit any suitable input component command 331 to control application module 330, which may be operative to wake up a system PMU such that control application module 330 may be configured to provide any suitable output component command 333 to display output component 112*a* that may normally be disabled during a battery trap operating mode, where that command 333 may be operative to at least temporarily power on display output component 112*a* for presenting at event 482 the "dead battery UI" screen 190*b* of FIG. 2B to the user that may be indicative of the current battery trap mode of device 100 (e.g., via drained battery icon 201) but that may not be indicative of any express mode cards being enabled in the current battery trap mode (e.g., due to NFC component 120 being in the NFC OFF power mode state of state 471) (e.g., as compared to a "Express Mode capability UI" screen 190*a* of FIG. 2A that may be presented to a user at event 455 that may be indicative of a current battery trap mode of device 100 (e.g., via drained battery icon 201) but that may also be indicative of at least one express mode card being enabled in the current battery trap mode (e.g., due to NFC component 120 being in an NFC low power mode of state 451) (e.g., via text 203). As shown by a distinction line ("DL"), all operations above line DL in state diagram 400 may be carried out when a system PMU of device 100 may be powered on and/or awake and/or active (e.g., when an operating system application or a boot loader application or otherwise may be in use by device 100), while all operations below line DL in state diagram 400 may be carried out when a system PMU of device 100 may be in an off state or powered off or inactive. For example, when a PMU is in an off state, the PMU may still not be completely turned off, as it may still support processing button presses or one or more other functionalities (e.g., a PMU may include at least one always on domain in the PMU that's still alive when the PMU is in an off state). Alternatively, a PMU may be completely off in an off state. NFC transactions and/or haptic feedback and/or other certain output feedback may be able to occur completely independent of a system PMU (e.g., a PMU can remain in an off state while an NFC component and/or an output component may operate in a low power mode (e.g., an NFC component and/or an output component may be powered on by its own by a power source without relying on any rails from the PMU, and/or may receive the same or different amounts of power when operating in a low power mode or full power mode)). It is to be understood that any suitable wake event or condition 452 and/or 472 may be configured as any suitable user interaction that is properly enabled by device 100 (e.g., raise to wake gesture, a tap on a touch-sensitive display, a voice trigger, a button press, etc.).

One or more suitable conditions 402 may be satisfied in order to transition from state 401 to state 471, including, but not limited to, a condition in which a user manually shuts down (e.g., powers off) device 100 (e.g., by pressing and holding side button 110*b* for at least a particular duration of time (e.g., 3 seconds)), or a condition in which not only is the current charge of power supply 108 below threshold charge level 163 (e.g., as may be detected by module 310 using power level data 307) but also no credential on device 100 is currently designated as an express mode card (e.g., as may be determined when LPMF is equal to '0' (e.g., as may be enforced by an action 526 of state diagram 500)). In some particular embodiments, NFC component 120 may be configured to transition from NFC FPM state 401 to NFC OFF state 471 when a particular NFC state transition sequencing protocol is carried out at operation 403. For example, as shown by an NFC state transition sequencing protocol of an NFC state transition operation 403, NFC component 120 may be configured to transition from NFC FPM state 401 to NFC OFF state 471 (e.g., after a certain order of certain operations (e.g., when a GPIO output from a system PMU to NFC component 120 (e.g., "NFC_EN") is set to "LOW" at least a certain amount of time (e.g., buffer or margin time (e.g., 3 milliseconds)) prior to disabling a supply rail for NFC component 120 (e.g., a 1.8 Volt supply rail "PP1V8_NFC"), although any other suitable operations may transition NFC component 120 between state 401 and state 471)).

Alternatively, one or more suitable other conditions 412 may be satisfied in order to transition from state 401 to state 451, including, but not limited to, a condition in which at least one credential on device 100 is currently designated as an express mode card (e.g., as may be determined when LPMF is equal to '1' (e.g., as may be enforced by an action 506 of state diagram 500)) when a user manually instructs device 100 to enter an NFC low power express mode (e.g., in response to power management system receiving particular input mode selection data 309 from an input component 110) (e.g., for conserving device power while maintaining the functionality of the at least one credential of NFC component 120 designated as an express mode card), or a condition in which at least one credential on device 100 is currently designated as an express mode card when the current charge of power supply 108 is detected to fall below threshold charge level 163 (e.g., as may be detected by module 310 using power level data 307), or a condition in which at least one credential on device 100 is currently designated as an express mode card when an undervoltage-lockout ("UVLO") event is detected (e.g., when a voltage of a battery of power supply 108 is detected to fall below any suitable UVLO threshold of a system PMU of device 100). In some particular embodiments, NFC component 120 may be configured to transition from NFC FPM state 401 to NFC LPM state 451 when a particular NFC state transition sequencing protocol is carried out at operation 413. For example, as shown by an NFC state transition sequencing protocol of an NFC state transition operation 413, NFC component 120 may be configured to transition from NFC FPM state 401 to NFC LPM state 451 (e.g., after a certain order of certain operations (e.g., when a GPIO output from a system PMU to NFC component 120 (e.g., "NFC_EN") is set to "LOW" within at least a certain amount of time (e.g., buffer or margin time (e.g., 3 milliseconds)) of disabling a supply rail for NFC component 120 (e.g., a 1.8 Volt supply rail "PP1V8_NFC"), although any other suitable operations may transition NFC component 120 between state 401 and state 451)). For example, such an NFC state transition sequencing protocol may be implemented in hardware by a PMU power down sequencer of device 100.

At NFC LPM state 451, in which NFC component 120 may be powered (e.g., directly by power 321p via switch 321s) while a system PMU may be inactive, electronic device 100 may be configured to operate in an NFC low power express mode (e.g., mode in which device 100, to conserve power, has turned off processor 102 and every communications component 106 and every output component 112 and every input component 110, except, perhaps, a particular output component 112 (e.g., haptic output component 112c) and/or a particular input component 110 (e.g., side button input component 110b) to enable a user to detect that device 100 is operating in the NFC low power express mode. Therefore, at state 451, a system PMU of device 100 may be powered off or inactive, power may be provided to NFC component 120 (e.g., directly through switch 321s), and only limited functionality, if any, may be enabled for other portions of electronic device, such as a functionality for enabling a user to determine if device 100 is operating in the NFC low power express mode. For example, if device 100 is operating in the NFC low power express mode while at state 451, a limited functionality may be enabled by device 100 for enabling the sensing of any suitable wake event or particular user interaction with a particular input component (e.g., a user press of side button input component 110b (e.g., detection of any suitable wake event condition 452), where side button input component 110b may be at least partially or at least temporarily enabled during the current power management mode (e.g., by power 325p during the NFC low power express mode of a battery trap mode)) and then, in response to sensing such a particular user input component interaction and in response to a determination at operation 453 that a particular power supply condition 454 is satisfied, temporarily powering on display output component 112a for displaying a very specific UI screen (e.g., a "Express Mode capability UI" screen 190a of FIG. 2A (e.g., at an operation 455)), such that a user may be able to determine that device 100 is operating in the NFC low power express mode (e.g., to provide a user some peace of mind that an express mode NFC transaction may be possible). For example, while device 100 is operating in the NFC low power express mode while NFC component is in an NFC LPM power mode at state 451, in response to detection of any suitable wake event 452 (e.g., button press condition 452 by input component 110b that may be powered directly by power 325p), input component 110b may be configured to generate and transmit any suitable input component command 331 to control application module 330, which may be operative to wake up a system PMU such that control application module 330 may be configured to make a determination at operation 453 that particular power supply condition 454 is satisfied and then to provide any suitable output component command 333 to display output component 112a that may normally be disabled during a NFC low power express mode of a battery trap operating mode, where that command 333 may be operative to at least temporarily power on display output component 112a for presenting at event 455 the "Express Mode capability UI" screen 190a of FIG. 2A to the user that may be indicative of the current battery trap mode of device 100 and that may be indicative of the fact that at least one express mode card is enabled in the current NFC low power express mode of the current battery trap mode (e.g., due to NFC component 120 being in the NFC LPM power mode state of state 451) (e.g., as compared to a "dead battery UI" screen 190b of FIG. 2B that may be presented to a user at event 482 that may be indicative of only a current battery trap mode of device 100 but that may not also be indicative of at least one express mode card being enabled in the current battery trap mode (e.g., due to NFC component 120 being in an NFC OFF power mode of state 471).

The determination at operation 453 may be any suitable determination of any suitable power supply condition. For example, in some embodiments, operation 453 may be operative to determine a condition of a "LOW_V" flag, which may be configured to be indicative of a relationship between the current charge of power supply 108 and a particular threshold charge level. As a particular example, operation 453 may generally be used to determine whether the current charge level of power supply 108 is above or below LPEM-off threshold charge level 165, which may be useful to determine whether to keep NFC component 120 in the NFC LPM power mode of state 451 or to transition NFC component 120 from the NFC LPM power mode of state 451 to the NFC OFF power mode of state 471 (e.g., for conserving power by powering off NFC component 120 and terminating the NFC low power express mode while still remaining in a battery trap mode (e.g., a low battery trap operating mode)). In a particular example, device 100 (e.g., device firmware) may be configured to set a LOW_V flag (e.g., a flag of a register of a system PMU) to be equal to '1' if each one of any suitable number of consecutive samples (e.g. 10 consecutive samples) of the current charge level of power supply 108 (e.g., using data 307) is determined to be less than LPEM-off threshold charge level 165 and may be configured to clear or reset the LOW_V flag to be equal to '0' when the current charge level of power supply 108 is determined to be at least a certain amount greater than LPEM-off threshold charge level 165 (e.g., at least 0.05 Volts greater than LPEM-off threshold charge level 165). Therefore, device 100 may be configured to make a confident determination at operation 453 that the current charge level of power supply 108 is either greater than LPEM-off threshold charge level 165 by satisfying condition 454 (e.g., LOW_V=0) or less than LPEM-off threshold charge level 165 by satisfying condition 457 (e.g., LOW_V=1). Thus, in response to device 100 detecting button press condition 452 and then determining at operation 453 that the current charge level of power supply 108 is greater than LPEM-off threshold charge level 165 by satisfying condition 454, device 100 may be configured to present "Express Mode capability UI" screen 190*a* of FIG. 2A at operation 455 and then return to (e.g., maintain NFC component 120 in the NFC LPM mode of) state 451 (e.g., via operation 456, at which a PMU RTC Alarm may be set), as power supply 108 may be operating in LPEM operating charge level range 164.

Alternatively, in response to device 100 detecting button press condition 452 and then determining at operation 453 that the current charge level of power supply 108 is less than LPEM-off threshold charge level 165 by satisfying condition 457, device 100 may be configured to transition NFC component 120 from the NFC LPM mode of state 451 to the NFC OFF mode of state 471 (e.g., via operation 458 and either operation 474 or operations 459 and 462 via state 461), as power supply 108 may no longer be operating in LPEM operating charge level range 164. Instead, in order to operate in a low battery trap operating mode for conserving further power by disabling NFC component 120, device 100 may be operative transition NFC component 120 from the NFC low power mode of NFC LPM state 451 to the NFC off power mode of NFC OFF state 471. Device 100 may be operative to carry out such a transition by first carrying out operation 458. At operation 458, device 100 may be configured to set LPMF to '0', which may prevent any credential on device 100 from being used as an express mode card until LPMF may be re-set back to '1' (e.g., at operation 499, where a user of device 100 may be reauthenticated (e.g., by entering a PIN to access functionality of a device operating system (e.g., to access screen 190 of FIG. 2)) once NFC component 120 has been transitioned back from the NFC off power mode of NFC OFF state 471 to the NFC full power mode of NFC FPM state 401 (e.g., via operations 492, 494, and 497), which may provide a layer of security to prevent an unauthorized user from being able to use an express card if/when device 100 were to ever return to NFC LPM state 451 after arriving at NFC OFF state 471). Additionally or alternatively, at operation 458, device 100 may be configured to disable an alarm (e.g., a PMU_RTC_ALARM (e.g., by setting PMU_ALARM_EN to '0')), such that the alarm may not timeout for initiating a routine while in NFC OFF state 471. After operation 458, device 100 may be configured to transition NFC component 120 from the NFC LPM mode of state 451 directly to the NFC OFF mode of state 471 when a particular NFC state transition sequencing protocol is carried out at operation 474. Alternatively, NFC component 120 may be configured to transition from the NFC LPM mode of state 451 to the NFC OFF mode of state 471 indirectly via a quick intermediate transition from the NFC LPM mode of state 451 to the NFC FPM mode of state 461. For example, NFC component 120 may be configured to transition from NFC LPM state 451 to NFC FPM state 461 when a particular NFC state transition sequencing protocol is carried out at operation 459 (e.g., after a certain order of certain operations (e.g., when a supply rail for NFC component 120 (e.g., a 1.8 Volt supply rail "PP1V8_NFC") is enabled at least a certain amount of time (e.g., buffer or margin time (e.g., 3 milliseconds)) prior to setting to "HIGH" a GPIO output from a system PMU to NFC component 120 (e.g., "NFC_EN"), although any other suitable operations may transition NFC component 120 between state 451 and state 461)), and then NFC component 120 may be configured to transition from NFC FPM state 461 to NFC OFF state 471 when a particular NFC state transition sequencing protocol is carried out at operation 462 (e.g., after a certain order of certain operations (e.g., when a GPIO output from a system PMU to NFC component 120 (e.g., "NFC_EN") is set to "LOW" at least a certain amount of time (e.g., buffer or margin time (e.g., 3 milliseconds)) prior to disabling a supply rail for NFC component 120 (e.g., a 1.8 Volt supply rail "PP1V8_NFC"), although any other suitable operations may transition NFC component 120 between state 461 and state 471)). Then, once NFC component 120 has been transitioned to the NFC off power mode of NFC OFF state 471, NFC component 120 may remain in the NFC off power mode of NFC OFF state 471 until power supply 108 has been charged above a particular threshold charge level (e.g., threshold charge level 163) for enabling the transition back to the NFC full power mode of NFC FPM state 401. For example, as shown, when in state 471, device 100 may be operative to carry out a device charging operation 492 (e.g., in response to any suitable charging event (e.g., a user plugging device 100 into an electrical outlet for receiving external power generated by an electrical power plant)), during which any suitable "Charge & Display UI" screen may be presented to a user at event 494 (e.g., to enable a user to determine that the device is being properly charged). However, until operation 492 results in the charge level of power supply 108 passing above a particular threshold charge level (e.g., threshold charge level 163) for satisfying condition 496 for enabling the transition back to the NFC full power mode of NFC FPM state 401 at operation 497, device 100 may satisfy condition 495 and may remain in the NFC FPM state 471. Therefore, device 100 may enable charging of power supply 108 for returning to FPM state 401 from OFF state 471, but may not enable charging of power supply 108 for returning only to LPM state 451 from OFF state 471. Moreover, it is to be understood that if device transitioned to OFF state 471 from ON state 401 in response to a condition 402 in which a user manually shut down (e.g., powered off) device 100, then operation 492 may include a user attempting to manually turn back on device 100, in which case condition 496 may be satisfied and device 100 may transition back from state 471 to state 401 without any actual charging of power supply 108.

With further reference to state 451, if device 100 is operating in the NFC low power express mode while at state 451, rather than (e.g., before) detection of any button press condition 452 for initiating a user-initiated device capability check process, an alarm timeout condition 442 may be detected for initiating a silent device-initiated device capability check process, in response to which device 100 may be operative to make a determination at operation 463 about the current charge level of power supply 108 with respect to any suitable threshold charge level (e.g., threshold charge level 165). For example, alarm timeout condition 442 may be a condition in which a PMU_RTC_ALARM is triggered, where such a condition may be triggered when an RTC counter register value of an RTC (e.g., a value of a first register 353 of RTC 351) is greater than a defined PMU_RTC_ALARM value (e.g., a stored value in hardware of a system PMU). As shown in FIG. 5, while device 100 may be in state 521 and operating in a full power operating mode, in response to any suitable event 532 in which a SW_Alarm may elapse (e.g., be triggered), device 100 may be configured to take one or more actions 536, including, but not limited to, one or more of the following actions:

(1) setting PMU_ALARM_EN=1, which may enable an alarm of a system PMU to be enabled and/or set and/or monitored;
(2) configuring PMU_RTC_ALARM for another duration X, which may reset the value of PMU_RTC_ALARM by any suitable duration X; and/or
(3) configuring a SW_Alarm for X−1 minutes, which may reset the value of a software alarm by any suitable duration that may be at least slightly less that the reset duration of the PMU_RTC_ALARM, or, other embodiments, the SW_alarm may be any other suitable software alarm, which could be a part of any other periodic system wakeup event (e.g., to check for cellular signal strength, etc.).

This may enable the PMU_RTC_ALARM to be continuously reset to a duration X (e.g., 1 hour, 2 hours, 4 hours, etc.) at a periodic frequency at least slight less than duration X while device 100 may be in the full power state 521 (e.g., state 401 when LPMF is set to '1'). Therefore, a hardware based PMU alarm (PMU_RTC_ALARM) may always be active when device 100 may transition from NFC FPM state 401 to NFC LPM state 451, such that alarm timeout condition 442 ought to occur at least within duration X of the transition from state 401 to state 451. In response to detection of a PMU alarm (PMU_RTC_ALARM) timing out at condition 442, device 100 may be operative to (e.g., further) wake up a system PMU such that control application module 330 may be configured to make a determination at operation 463 that particular power supply condition 464 is satisfied and then to re-set the PMU alarm (PMU_RTC_ALARM) (e.g., to duration X) at operation 456 before returning to NFC LPM state 451. Alternatively, in response to detection of a PMU alarm (PMU_RTC_ALARM) timing out at condition 442, device 100 may be operative to (e.g., further) wake up a system PMU such that control application module 330 may be configured to make a determination at operation 463 that particular power supply condition 465 is satisfied and then to proceed to operation 458 for transitioning NFC component 120 from NFC LPM state 451 to NFC OFF state 471.

The determination at operation 463 may be may be any suitable determination of any suitable power supply condition, such as the same operation as operation 453 or an operation substantially similar to operation 453. For example, in some embodiments, operation 463 may be operative to determine a condition of a "LOW_V" flag, which may be configured to be indicative of a relationship between the current charge of power supply 108 and a particular threshold charge level. As a particular example, operation 463 may generally be used to determine whether the current charge level of power supply 108 is above or below LPEM-off threshold charge level 165, which may be useful to determine whether to keep NFC component 120 in the NFC LPM power mode of state 451 or to transition NFC component 120 from the NFC LPM power mode of state 451 to the NFC OFF power mode of state 471 (e.g., for conserving power by powering off NFC component 120 and terminating the NFC low power express mode while still remaining in a battery trap mode (e.g., a low battery trap operating mode)). In a particular example, device 100 (e.g., device firmware) may be configured to set a LOW_V flag (e.g., a flag of a register of a system PMU) to be equal to '1' if each one of any suitable number of consecutive samples (e.g. 10 consecutive samples) of the current charge level of power supply 108 (e.g., using data 307) is determined to be less than LPEM-off threshold charge level 165 and may be configured to clear or reset the LOW_V flag to be equal to '0' when the current charge level of power supply 108 is determined to be at least a certain amount greater than LPEM-off threshold charge level 165 (e.g., at least 0.05 Volts greater than LPEM-off threshold charge level 165). Therefore, device 100 may be configured to make a confident determination at operation 463 that the current charge level of power supply 108 is either greater than LPEM-off threshold charge level 165 by satisfying condition 464 (e.g., LOW_V=0) or less than LPEM-off threshold charge level 165 by satisfying condition 465 (e.g., LOW_V=1). Thus, in response to device 100 detecting RTC alarm timeout condition 442 and then determining at operation 463 that the current charge level of power supply 108 is greater than LPEM-off threshold charge level 165 by satisfying condition 464, device 100 may be configured to return to (e.g., maintain NFC component 120 in the NFC LPM mode of) state 451 (e.g., via operation 456, at which a PMU RTC Alarm may be re-set), as power supply 108 may be operating in LPEM operating charge level range 164. Alternatively, in response to device 100 detecting RTC alarm timeout condition 442 and then determining at operation 463 that the current charge level of power supply 108 is less than LPEM-off threshold charge level 165 by satisfying condition 465, device 100 may be configured to transition NFC component 120 from the NFC LPM mode of state 451 to the NFC OFF mode of state 471 (e.g., via operation 458 and either operation 474 or operations 459 and 462 via state 461), as power supply 108 may no longer be operating in LPEM operating charge level range 164. Therefore, condition 442 may enable device 100 to periodically determine whether or not to transition from state 451 to state 471 (e.g., especially in absence of any regular condition 452).

NFC component 120 may remain in the NFC low power mode of NFC LPM state 451 until power supply 108 has been charged above a particular threshold charge level (e.g., threshold charge level 163) for enabling the transition back to the NFC full power mode of NFC FPM state 401. For example, as shown, when in state 451, device 100 may be operative to carry out a device charging operation 466 (e.g., in response to any suitable charging event (e.g., a user plugging device 100 into an electrical outlet for receiving external power generated by an electrical power plant)), during which any suitable "Charge & Display UI" screen may be presented to a user at event 467 (e.g., to enable a user to determine that the device is being properly charged). However, until operation 466 results in the charge level of power supply 108 passing above a particular threshold charge level (e.g., threshold charge level 163) for satisfying condition 468 for enabling the transition back to the NFC full power mode of NFC FPM state 401 at operation 498 (e.g., an operation that may be similar to operation 459), device 100 may satisfy condition 469 and may remain in the NFC LPM state 451. Therefore, device 100 may enable charging of power supply 108 for returning to FPM state 401 from LPM state 451, and may also enable charging of power supply 108 for returning to LPM state 451 from LPM state 451 (e.g., to remain in LPM state 451 if the charging accomplished at operation 466 is not sufficient to satisfy condition 468). Moreover, it is to be understood that if device transitioned to LPM state 451 from ON state 401 in response to a condition 412 in which a user manually instructed such a transition, then operation 466 may include a user attempting to manually instruct a transition back from state 451 to state 401 (e.g., through any suitable interaction with an enabled input component (e.g., through a long hold of button input component 110*b* or another input component interaction)), in which case condition 466 may be satisfied and device 100 may transition back from state 451 to state 401 without any actual charging of power supply 108. It is understood that the various operations and conditions shown in state diagram 400 of FIG. 4 are only illustrative and that existing operations and conditions may be modified or omitted, additional operations and conditions may be added, and the order of certain operations and conditions may be altered.

As mentioned, while operating in an NFC low power mode of NFC LPM state 451, NFC component 120 may be configured to carry out any suitable transactions or communications 55 between electronic device 100 and terminal 10 at operation 451*n* using any credential of device 100 that is currently designated as an express mode card. At any point during even an attempt at a transaction at operation 451*n* or after a transaction has been completed at operation 451*n*, device 100 may be configured to generate any suitable output that may be operative to indicate such an attempted or completed transaction to a user of device 100. However, due to the fact that a majority or the entirety of all software and/or applications and/or even a system PMU may be inactive or off during such an attempt or at such a completion of operation 451*n*, NFC component 120 may be operative to control the generation and transmission of an appropriate command for inciting such an output to user. For example, as shown in FIG. 3, NFC component 120 may be configured to generate and transmit any suitable NFC activity output command 341 directly to any suitable output component 112 that may be operable during the NFC LPM mode of operation of state 451 (e.g., haptic output component 112*c* that may be powered by power 323*p* directly from power supply 108 during the NFC LPM mode of operation of state 451). For example, haptic feedback output component 112*c* may include a haptic driver amplifier 361 on which may be loaded a haptic waveform 363 that may be automatically played back by haptic driver amplifier 361 in response to haptic feedback output component 112*c* receiving an NFC activity output command 341 from NFC component 120 while device 100 may be operating in an NFC low power mode of NFC LPM state 451. This may enable device 100 to provide haptic feedback to a user in response to NFC component 120 at least attempting to conduct a transaction with terminal 55 using an express mode card while device 100 may be operating in an NFC low power mode of NFC LPM state 451 (e.g., without a system PMU may be inactive or off and may not be providing any power to any output component or NFC component of device 100). As shown in FIG. 5 by an action 506 when a first express mode card is enabled on device 100, an output waveform (e.g., waveform 363) may be loaded onto a driver amplifier (e.g., amplifier 361) (e.g., a haptic waveform may be loaded onto a haptic driver amplifier and/or an audio waveform may be loaded onto an audio driver amplifier), and/or a GPIO ("NFC_GPIO2_AO=OPT_RESET_L=HIGH") may be set high as always on to enable haptic driver amplifier 361 to be triggered in an NFC low power mode, such that it may be ensured that a haptic waveform may be available for playback during an NFC low power mode. Although this output has been described as a haptic feedback output using a haptic feedback output component, it is to be understood that various other types of output information may be presented by any other suitable output component other than a haptic output component (e.g., user information may be provided audibly to a user via audio speaker output component 112*b* (e.g., any suitable audio waveform may be loaded onto any suitable audio driver amplifier and used in a similar manner to any haptic waveform and/or any haptic driver amplifier described above) or visibly to a user via a visual output component (e.g., an LED)). Therefore, device 100 may be operative to carry out one or more NFC transactions and provide any suitable output that may be operative to indicate such an attempted or completed transaction to a user of device 100 while in a low powered operating state at which both a system PMU and any device operating system may be off or disabled or inactive. Various transitions between states of state diagram 400 (e.g., above line DL) may be accomplished using a system PMU and a boot loader application of device 100 but not a full operating system application, such that significant power savings may be realized, while certain actions within a state (e.g., below line DL (e.g., action 451*n*, which may include generating a haptic or other user detectable output)) may be accomplished without even using a system PMU or loading any application for realizing additional power savings while also securely enabling certain NFC transactions for improving user convenience.

Although many of the concepts described herein (e.g., with respect to one, some, or each of FIGS. 1-5) have been described with respect to managing near field communications (e.g., by NFC component 120) during different power management modes of an electronic device, it is to be understood that various other types of communications (e.g., by any other suitable communications component or communications circuitry) and/or any other suitable device functionalities may be similarly managed. For example, any suitable first type of communications circuitry 106 (e.g., a higher powered communications circuitry, such as broadband cellular network communications circuitry or Wi-Fi, etc.) may be turned off or disabled or inactive during any suitable battery trap operating mode while any suitable second type of communications circuitry 106 (e.g., a lower powered communications circuitry, such as Bluetooth or the like) may be selectively or continuously used during any suitable battery trap operating mode. Therefore, device 100 may be operative to carry out one or more specific communication type functionalities (e.g., Bluetooth communications) and provide any suitable output that may be operative to indicate such an attempted or completed communication of that type to a user of device 100 (e.g., playing back a particular audio waveform in response to a Bluetooth communication being received by the device) while in a low powered operating state at which both a system PMU and any device operating system and/or any other communication type functionalities (e.g., cellular) may be off or disabled or inactive. Various transitions between states of state diagram 400 (e.g., above line DL) may be accomplished using a system PMU and a boot loader application of device

100 but not a full operating system application, such that significant power savings may be realized, while certain actions within a state (e.g., below line DL (e.g., action 451*n*, which may include generating a haptic or other user detectable output)) may be accomplished without even using a system PMU or loading any application for realizing additional power savings while also securely enabling certain types of communications for improving user convenience (e.g., enabling Bluetooth communications to provide certain functionality to the device in the low powered operating state (e.g., communicate with other devices via Bluetooth to enable detection of the device in the low powered operating state) (e.g., the LPMF may be set to '1' if a user wishes for the Bluetooth communication component to be enabled during the low powered operating state and the LPMF may be set to '0' if a user wishes for the Bluetooth communication component not to be enabled during the low powered operating state)). Therefore, if the device's operating system is not running because the device needs to be charged, there may still be enough power in the battery to support the express mode (e.g., to support "Express Card" transactions). The device may be configured to automatically support this feature with any suitable credentials, including, but not limited to, a transit card designated as an "Express Transit" card (e.g., automatically upon provisioning or manually by a user), student ID cards with "Express Mode" turned on, and/or the like. The device may be configured such that, in response to receiving any suitable user interaction with any suitable device input component, such as a user pressing a side button, the device may display a low battery icon as well as text indicating Express Cards are available to use. The NFC controller may perform express card transactions under the same conditions as when the device's operating system is running, except that transactions may be indicated with only limited output component use (e.g., haptic notification, but without any visible notification being presented). This feature may not be available when a standard user initiated shutdown is performed.

Figure 6:
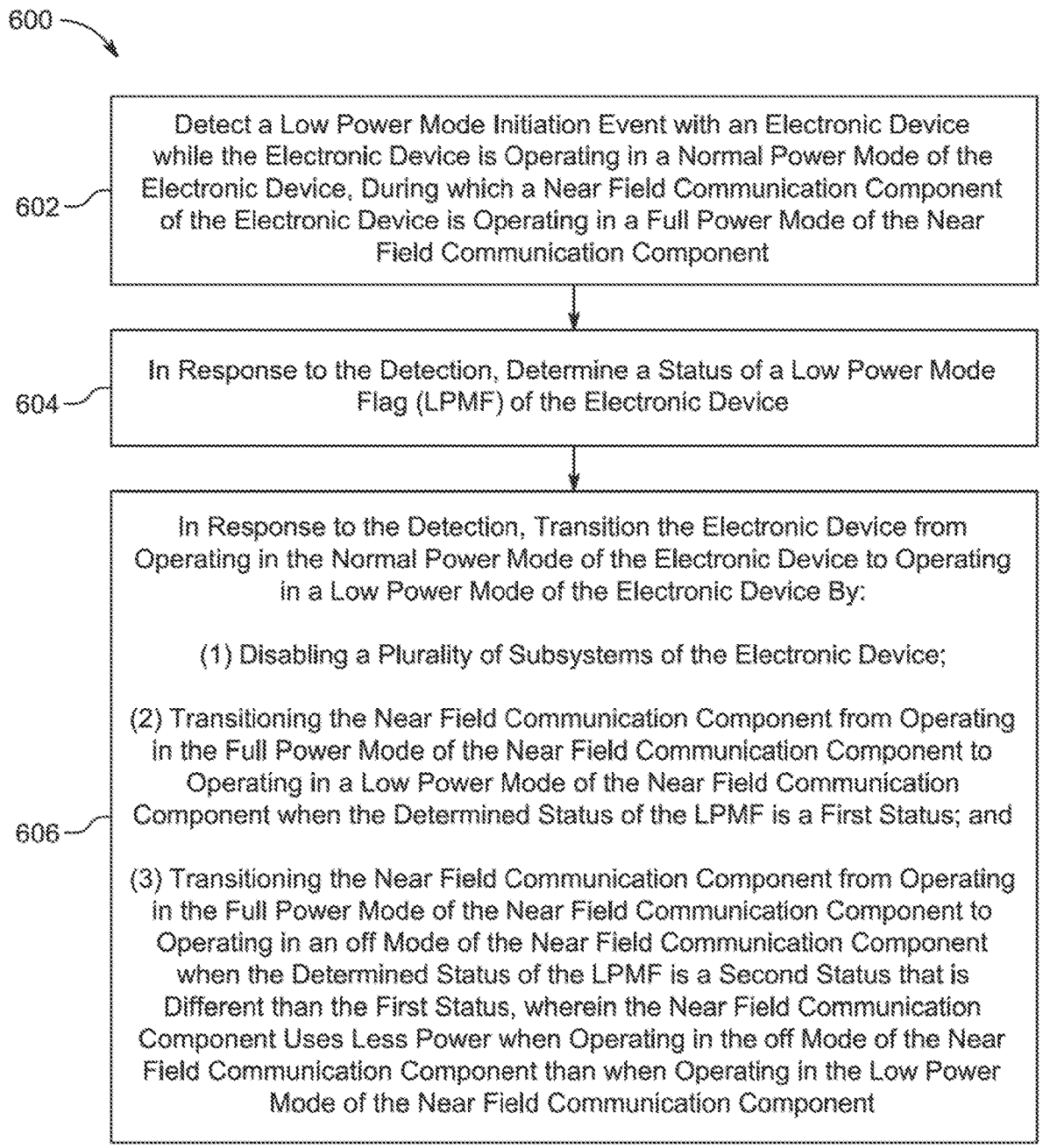
FIGS. 6-8 are flowcharts of illustrative processes for managing communications.

FIG. 6 is a flowchart of an illustrative process 600 for operating an electronic device that includes a near field communication component. At operation 602 of process 600, while the electronic device is operating in a normal power mode of the electronic device, during which the near field communication component is operating in a full power mode of the near field communication component, a low power mode initiation event may be detected with the electronic device (e.g., the charge of power supply 108 of device 100 may be detected to be below threshold 163). At operation 604 of process 600, in response to the detection of operation 602 of process 600, a status of a low power mode flag (LPMF) of the electronic device may be determined (e.g., a status of the LPMF of device 100 may be determined). At operation 606 of process 600, in response to the detection of operation 602 of process 600, the electronic device may be transitioned from operating in the normal power mode of the electronic device to operating in a low power mode of the electronic device by disabling a plurality of subsystems of the electronic device, transitioning the near field communication component from operating in the full power mode of the near field communication component to operating in a low power mode of the near field communication component when the determined status of the LPMF is a first status, and transitioning the near field communication component from operating in the full power mode of the near field communication component to operating in an off mode of the near field communication component when the determined status of the LPMF is a second status that is different than the first status, wherein the near field communication component uses less power when operating in the off mode of the near field communication component than when operating in the low power mode of the near field communication component (e.g., device 100 may transition from a normal power mode to a low power mode by disabling a power management unit and/or a device operating system of device 100, and by providing power from power supply 108 to NFC component 120 for enabling communication of an express mode credential when LPMF=1 (e.g., by configuring NFC component 120 in an NFC low power mode state 451) or by providing no power from power supply 108 to NFC component 120 when LPMF=0 (e.g., by configuring NFC component 120 in an NFC off mode state 471)).

It is understood that the operations shown in process 600 of FIG. 6 are only illustrative and that existing operations may be modified or omitted, additional operations may be added, and the order of certain operations may be altered.

Figure 7:
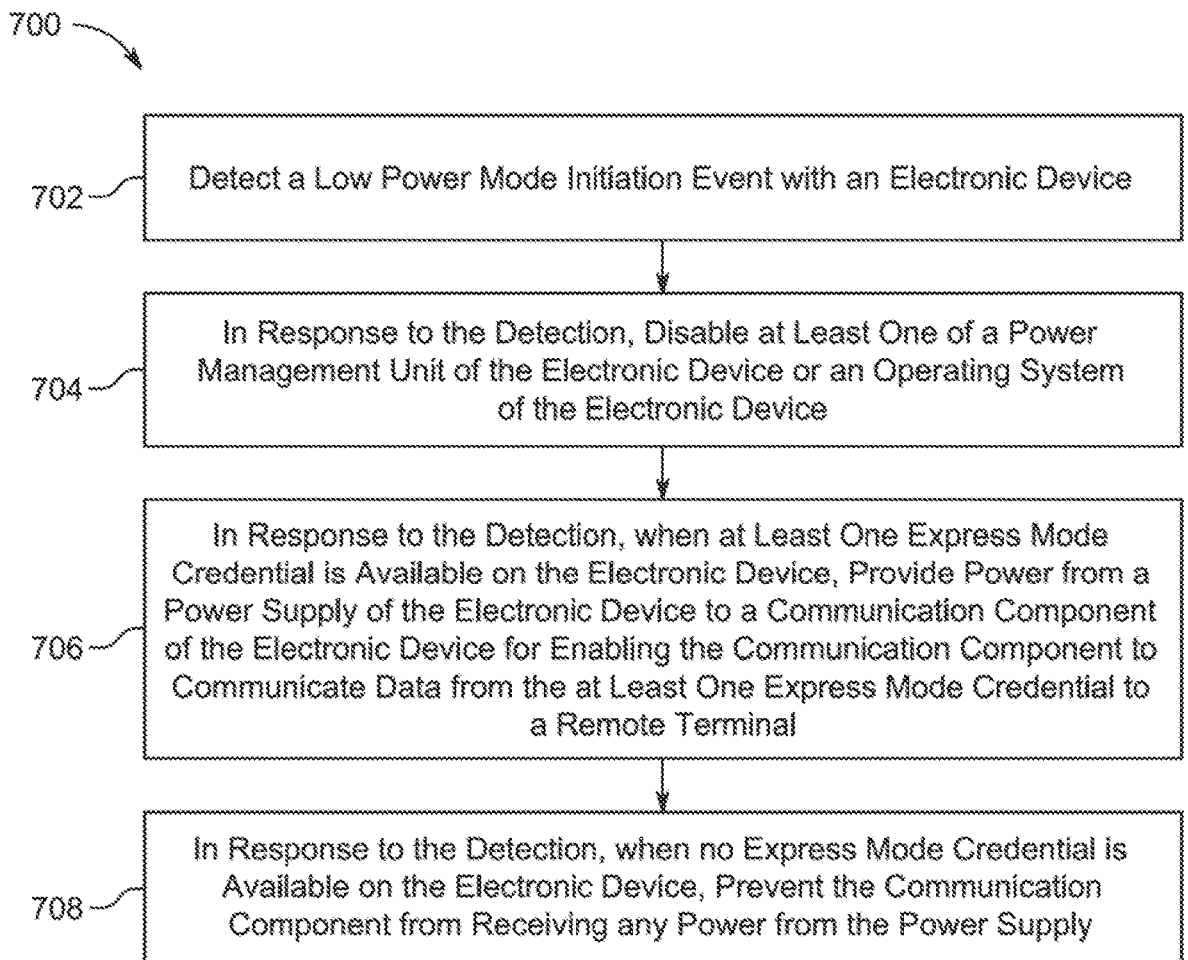

FIG. 7 is a flowchart of an illustrative process 700 for operating an electronic device that includes a communication component and a power supply. At operation 702 of process 700, a low power mode initiation event may be detected with the electronic device (e.g., the charge of power supply 108 of device 100 may be detected to be below threshold 163). At operation 704 of process 700, in response to the detection of operation 702 of process 700, at least one of a power management unit of the electronic device or an operating system of the electronic device may be disabled (e.g., a power management unit and/or a device operating system of device 100 may be disabled). At operation 706 of process 700, in response to the detection of operation 702 of process 700, when at least one express mode credential is available on the electronic device, power may be provided from the power supply to the communication component for enabling the communication component to communicate data from the at least one express mode credential to a remote terminal (e.g., NFC component 120 may be provided with power from power supply 108 for enabling communication of an express mode credential when LPMF=1). At operation 708 of process 700, in response to the detection of operation 702 of process 700, when no express mode credential is available on the electronic device, the communication component may be prevented from receiving any power from the power supply (e.g., no power may be provided by power supply 108 to NFC component 120 when LPMF=0).

It is understood that the operations shown in process 700 of FIG. 7 are only illustrative and that existing operations may be modified or omitted, additional operations may be added, and the order of certain operations may be altered.

Figure 8:
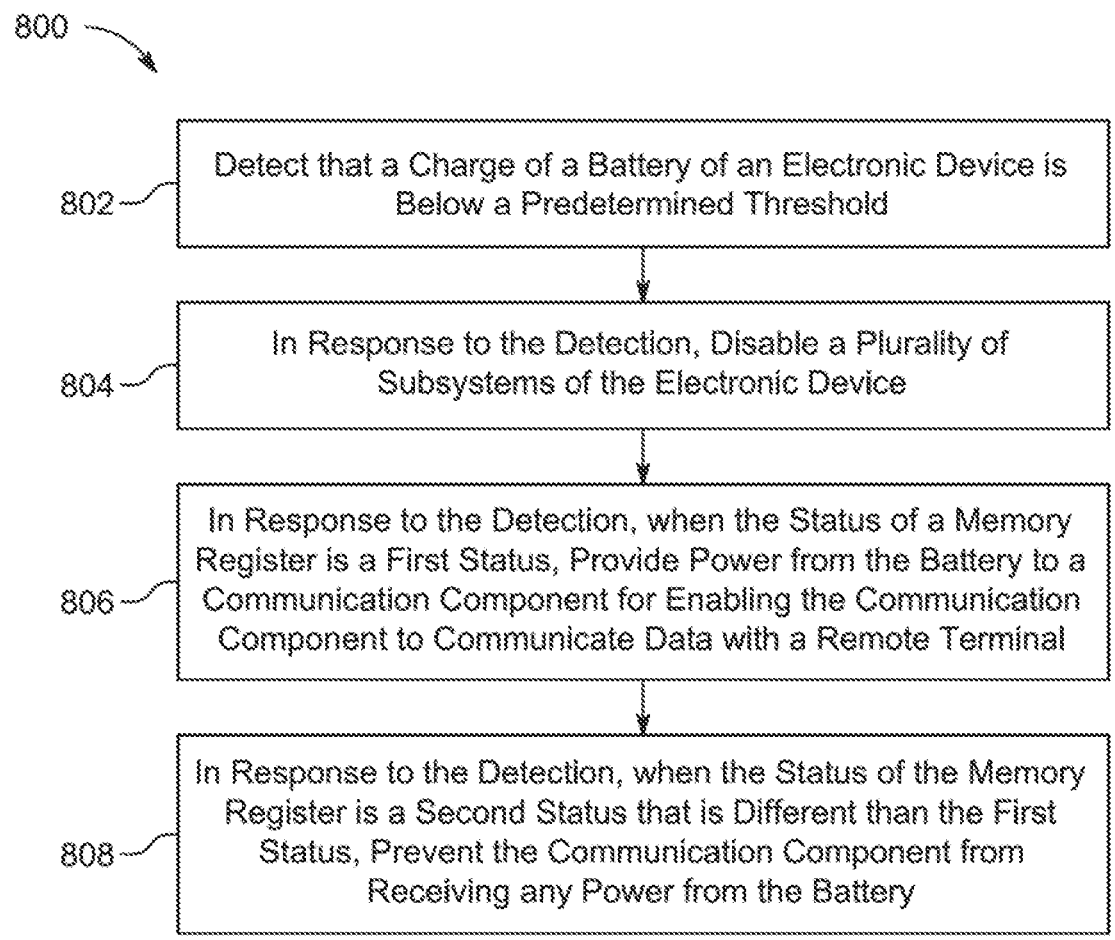

FIG. 8 is a flowchart of an illustrative process 800 for operating an electronic device that includes a communication component, a memory register, and a battery. At operation 802 of process 800, a charge of the battery may be detected to be below a predetermined threshold (e.g., the charge of power supply 108 of device 100 may be detected to be below threshold 163). At operation 804 of process 800, in response to the detection of operation 802 of process 800, a number of subsystems of the electronic device may be disabled (e.g., a power management unit and/or a device operating system and/or a touch screen input component of device 100 may be disabled). At operation 806 of process 800, in response to the detection of operation 802 of process 800, when the status of the memory register is a first status, power may be provided from the battery to the communication component for enabling the communication component to communicate data with a remote terminal (e.g., NFC component 120 may be provided with power from power supply 108 for enabling communication of an express mode credential when LPMF=1). At operation 808 of process 800, in response to the detection of operation 802 of process 800, when the status of the memory register is a second status that is different than the first status, the communication component may be prevented from receiving any power from the battery (e.g., no power may be provided by power supply 108 to NFC component 120 when LPMF=0).

It is understood that the operations shown in process 800 of FIG. 8 are only illustrative and that existing operations may be modified or omitted, additional operations may be added, and the order of certain operations may be altered.

Moreover, one, some, or all of the processes described with respect to FIGS. 1-8 may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory, a random-access memory, a flash memory, a CD-ROM, a DVD, a magnetic tape, a removable memory card, and a data storage device (e.g., an optical data storage device, such as memory 104 and/or memory module 150 of FIG. 1). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol (e.g., the computer-readable medium may be communicated to electronic device 100 via communications component 106 (e.g., as at least a portion of application 103 and/or application 143)). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

It is to be understood that any or each module of either one or both of NFC component 120 and power management subsystem 301 may be provided as a software construct, firmware construct, one or more hardware components, or a combination thereof. For example, any or each module of either one or both of NFC component 120 and power management subsystem 301 may be described in the general context of computer-executable instructions, such as program modules, that may be executed by one or more computers or other devices. Generally, a program module may include one or more routines, programs, objects, components, and/or data structures that may perform one or more particular tasks or that may implement one or more particular abstract data types. It is also to be understood that the number, configuration, functionality, and interconnection of the modules of either one or both of NFC component 120 and power management subsystem 301 are only illustrative, and that the number, configuration, functionality, and interconnection of existing modules may be modified or omitted, additional modules may be added, and the interconnection of certain modules may be altered.

At least a portion of one or more of the modules of either one or both of NFC component 120 and power management subsystem 301 may be stored in or otherwise accessible to device 100 in any suitable manner (e.g., in memory 104 of device 100 (e.g., as at least a portion of application 103 and/or application 143)). Any or each module of either one or both of NFC component 120 and power management subsystem 301 may be implemented using any suitable technologies (e.g., as one or more integrated circuit devices), and different modules may or may not be identical in structure, capabilities, and operation. Any or all of the modules or other components of either one or both of NFC component 120 and power management subsystem 301 may be mounted on an expansion card, mounted directly on a system motherboard, or integrated into a system chipset component (e.g., into a "north bridge" chip).

Any or each module of either one or both of NFC component 120 and power management subsystem 301 may be a dedicated system implemented using one or more expansion cards adapted for various bus standards. For example, all of the modules may be mounted on different interconnected expansion cards or all of the modules may be mounted on one expansion card. With respect to NFC component 120, by way of example only, the modules of NFC component 120 may interface with a motherboard or processor 102 of device 100 through an expansion slot (e.g., a peripheral component interconnect ("PCI") slot or a PCI express slot). Alternatively, NFC component 120 need not be removable but may include one or more dedicated modules that may include memory (e.g., RAM) dedicated to the utilization of the module. In other embodiments, NFC component 120 may be integrated into device 100. For example, a module of NFC component 120 may utilize a portion of device memory 104 of device 100. Any or each module of either one or both of NFC component 120 and power management subsystem 301 may include its own processing circuitry and/or memory. Alternatively, any or each module of either one or both of NFC component 120 and power management subsystem 301 may share processing circuitry and/or memory with any other module of NFC component 120 and/or power management subsystem 301 and/or processor 102 and/or memory 104 of device 100.

As mentioned, electronic device 100 may drive a display (e.g., display output component 112*a*) with graphical data to display a graphical user interface ("GUI") 180. GUI 180 may be configured to receive touch input via a touch input component 110*f*. Embodied as a touch screen (e.g., with display output component 112*a* as I/O component 114*a*), touch I/O component 110*f* may display GUI 180. Alternatively, GUI 180 may be displayed on a display (e.g., display output component 112*a*) separate from touch input component 110*f*. GUI 180 may include graphical elements displayed at particular locations within the interface. Graphical elements may include, but are not limited to, a variety of displayed virtual input devices, including virtual scroll wheels, a virtual keyboard, virtual knobs, virtual buttons, any virtual user interface ("UI"), and the like. A user may perform gestures at one or more particular locations on touch input component 110*f*, which may be associated with the graphical elements of GUI 180. In other embodiments, the user may perform gestures at one or more locations that are independent of the locations of graphical elements of GUI 180. Gestures performed on a touch input component 110 may directly or indirectly manipulate, control, modify, move, actuate, initiate, or generally affect graphical elements, such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad may generally provide indirect interaction. Gestures may also affect non-displayed GUI elements (e.g., causing user interfaces to appear) or may affect other actions of device 100 (e.g., affect a state or mode of a GUI, application, or operating system). Gestures may or may not be performed on a touch input component 110 in conjunction with a displayed cursor. For instance, in the case in which gestures are performed on a touchpad, a cursor or pointer may be displayed on a display screen or touch screen and the cursor or pointer may be controlled via touch input on the touchpad to interact with graphical objects on the display screen. In other embodiments, in which gestures are performed directly on a touch screen, a user may interact directly with objects on the touch screen, with or without a cursor or pointer being displayed on the touch screen. Feedback may be provided to the user via bus 118 in response to or based on the touch or near touches on a touch input component 110. Feedback may be transmitted optically, mechanically, electrically, olfactory, acoustically, or the like or any combination thereof and in a variable or non-variable manner.

While there have been described systems, methods, and computer-readable media for managing near field communications, it is to be understood that many changes may be made therein without departing from the spirit and scope of the subject matter described herein in any way. Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

Therefore, those skilled in the art will appreciate that the invention can be practiced by other than the described embodiments, which are presented for purposes of illustration rather than of limitation.

What is claimed is:

1. A method comprising:
designating a credential on an electronic device as an initial credential for use in a low power mode of the electronic device;
in response to the designating, setting a status of a low power mode flag of a power management unit of the electronic device to a first status; and
after the setting the status of the low power mode flag, detecting a low power mode initiation event;
in response to detecting the low power mode initiation event:
determining the status of the low power mode flag of the power management unit of the electronic device to be the first status or a second status; and
responsive to determining that the status of the low power mode flag is set to the first status, transitioning a near field communication component from operating in a full power mode to operating in a low power mode, or
responsive to determining that the status of the low power mode flag is set to the second status, transitioning the near field communication component from operating in the full power mode to operating in an off mode.

2. The method of claim 1, further comprising:
undesignating the credential on the electronic device as the initial credential for use in the low power mode of the electronic device; and
in response to the undesignating, setting the status of the low power mode flag of the power management unit of the electronic device to the second status.

3. The method of claim 1, wherein:
the near field communication component is configured to actively communicate data from at least one credential on the electronic device to a remote terminal while the near field communication component is operating in the low power mode; and
the near field communication component is not configured to actively communicate any data from any credential on the electronic device to the remote terminal while the near field communication component is operating in the off mode.

4. The method of claim 1, wherein the detecting the low power mode initiation event comprises receiving a particular user input via at least one input component of the electronic device.

5. The method of claim 1, wherein the detecting the low power mode initiation event comprises determining that a charge of a power supply of the electronic device is below a predetermined threshold.

6. The method of claim 5, wherein the predetermined threshold is a minimum battery charge value for executing a device operating system of the electronic device.

7. The method of claim 1, wherein the low power mode flag is a register in at least one of the power management unit of the electronic device or a non-volatile memory of the electronic device.

8. An electronic device comprising:
a memory;
a power management unit;
a near field communication component; and
at least one processor configured to:
designate a credential on the electronic device as an initial credential for use in a low power mode of the electronic device;
in response to the designate, set a status of a low power mode flag of the power management unit of the electronic device to a first status; and
after the status of the low power mode flag is set, in response to detection of a low power mode initiation event:
determine the status of the low power mode flag of the power management unit of the electronic device; and
responsive a determination that the status of the low power mode flag is set to the first status, transition the near field communication component from operating in a full power mode to operating in a low power mode.

9. The electronic device of claim 8, wherein the at least one processor is further configured to:
responsive to a determination that the status of the low power mode flag is set to a second status, transition the near field communication component from operating in the full power mode to operating in an off mode.

10. The electronic device of claim 9, wherein the at least one processor is further configured to:
undesignate the credential on the electronic device as the initial credential for use in the low power mode of the electronic device; and in response to the undesignation, set the status of the low power mode flag of the power management unit of the electronic device to the second status.

11. The electronic device of claim 9, wherein:
the near field communication component is configured to actively communicate data from at least one credential on the electronic device to a remote terminal while the near field communication component is operating in the low power mode; and
the near field communication component is not configured to actively communicate any data from any credential on the electronic device to the remote terminal while the near field communication component is operating in the off mode.

12. The electronic device of claim 8, wherein the at least one processor is configured to detect the low power mode initiation event by receiving a particular user input via at least one input component of the electronic device.

13. The electronic device of claim 8, wherein the at least one processor is configured to detect the low power mode initiation event by determining that a charge of a power supply of the electronic device is below a predetermined threshold.

14. The electronic device of claim 13, wherein the predetermined threshold is a minimum battery charge value for executing a device operating system of the electronic device.

15. The electronic device of claim 8, wherein the low power mode flag is a register in at least one of the power management unit of the electronic device or a non-volatile memory of the electronic device.

16. A non-transitory machine-readable medium comprising instructions that, when executed by one or more processors, causes the one or more processors to perform operations comprising:
designating a credential on an electronic device as an initial credential for use in a low power mode of the electronic device;
in response to the designating, setting a status of a low power mode flag of a power management unit of the electronic device to a first status; and
after the setting the status of the low power mode flag, in response to detecting a low power mode initiation event:
determining the status of the low power mode flag of the power management unit of the electronic device; and
responsive to determining that the status of the low power mode flag is set to the first status, transitioning a near field communication component from operating in a full power mode to operating in the low power mode.

17. The non-transitory machine-readable medium of claim 16, wherein the instructions further comprise:
responsive to determining that the status of the low power mode flag is set to a second status, transitioning the near field communication component from operating in the full power mode to operating in an off mode.

18. The non-transitory machine-readable medium of claim 17, wherein:
the near field communication component is configured to actively communicate data from at least one credential on the electronic device to a remote terminal while the near field communication component is operating in the low power mode; and
the near field communication component is not configured to actively communicate any data from any credential on the electronic device to the remote terminal while the near field communication component is operating in the off mode.

19. The non-transitory machine-readable medium of claim 16, wherein the detecting the low power mode initiation event comprises at least one of:
receiving a particular user input via at least one input component of the electronic device; or
determining that a charge of a power supply of the electronic device is below a predetermined threshold.

20. The non-transitory machine-readable medium of claim 16, wherein the detecting the low power mode initiation event comprises receiving a particular user input via at least one input component of the electronic device.

* * * * *